(12) United States Patent
Lewis

(10) Patent No.: US 6,307,622 B1
(45) Date of Patent: Oct. 23, 2001

(54) CORRELATION BASED OPTICAL RANGING AND PROXIMITY DETECTOR

(75) Inventor: Robert Alden Lewis, Sunnyvale, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 09/252,361

(22) Filed: Feb. 17, 1999

(51) Int. Cl.[7] .............................. B60T 7/16; G01S 13/00; G01C 3/08
(52) U.S. Cl. .......................... 356/4.01; 180/169; 342/115; 342/189; 356/4.01; 356/5.01
(58) Field of Search ..................................... 342/114, 115, 342/189, 195; 356/4.01, 5.01; 180/169

(56) References Cited

U.S. PATENT DOCUMENTS

| | | | |
|---|---|---|---|
| 5,141,308 | 8/1992 | Danckwerth et al. | 356/5 |
| 5,189,428 | 2/1993 | Bouvet et al. | 342/132 |
| 5,417,114 | 5/1995 | Wadaka et al. | 73/602 |
| 5,786,788 | * 7/1998 | Schober et al. | 342/159 |
| 5,903,597 | * 5/1999 | Pon | 375/209 |

* cited by examiner

Primary Examiner—Stephen C. Buczinski

(57) ABSTRACT

A method and a system for detecting and ranging objects utilize summed and difference signals to determine whether a target is present at a predetermined distance from the system. The summed and difference signals represent corresponding points on two discriminator functions that are derived by summing and subtracting two autocorrelation functions. The two autocorrelation functions are identical functions, except that one has been shifted by a one-bit period. By analyzing the summed and difference signals, the system is able to detect objects that cross a boundary zone located at the predetermined distance from the system. In the preferred embodiment, an optical signal is transmitted by a transmitter of the system to detect a target. Preferably, the optical signal is modulated in accordance with a double concatenated eleventh order Barker-based code. The optical signal is received by an associated photodiode after being reflected by the target. The received signal is then cross-correlated to produce the two autocorrelation signals.

20 Claims, 18 Drawing Sheets

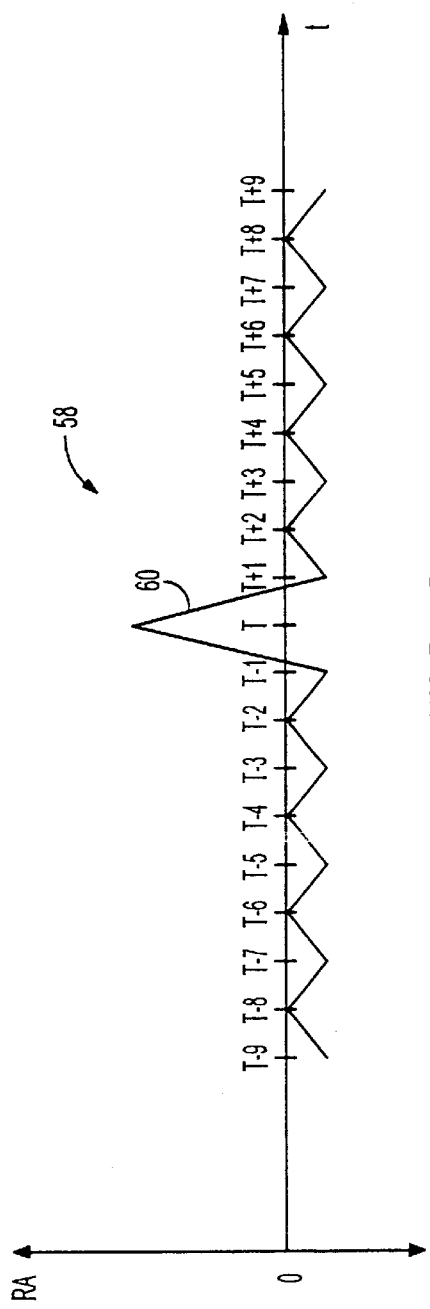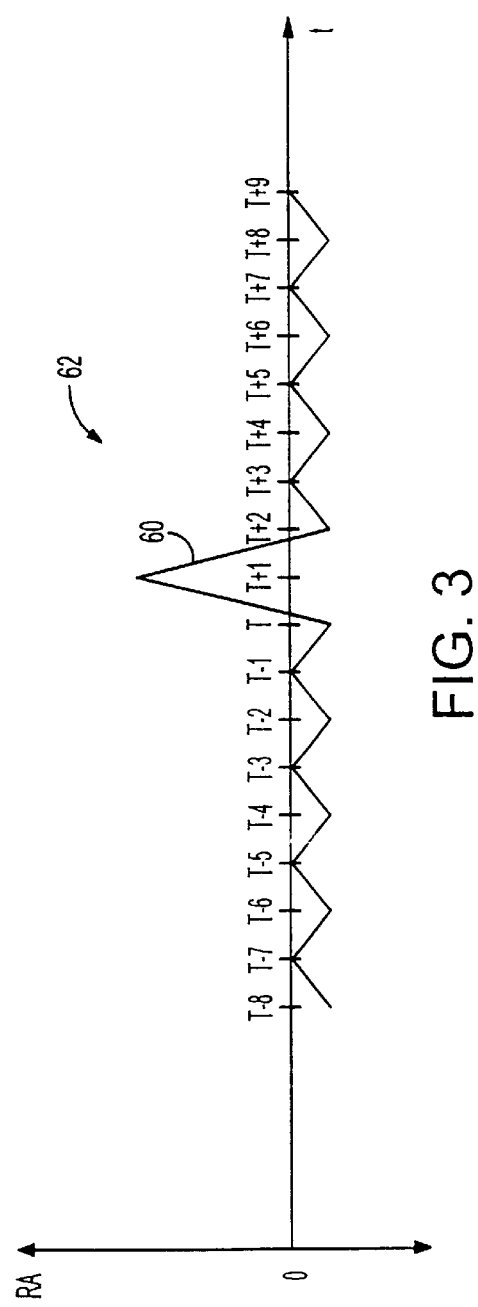

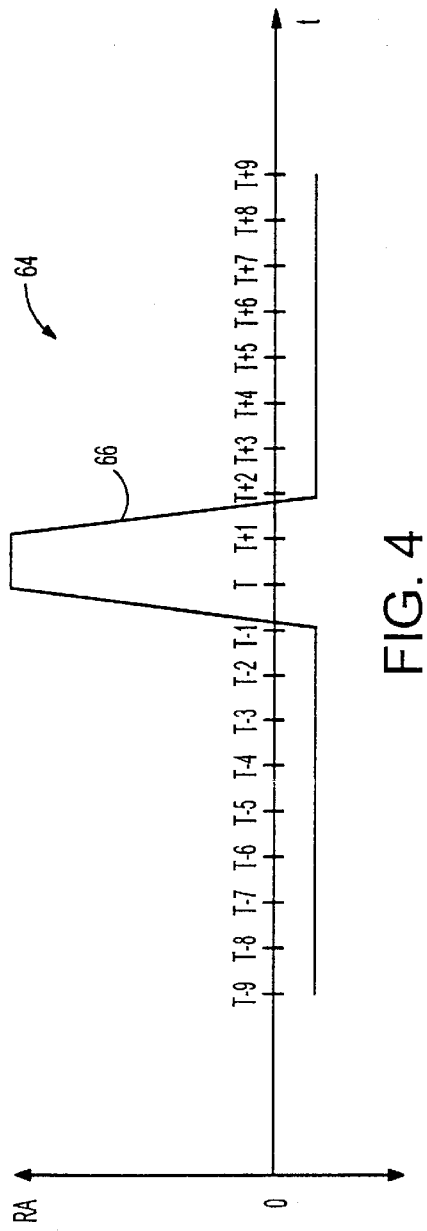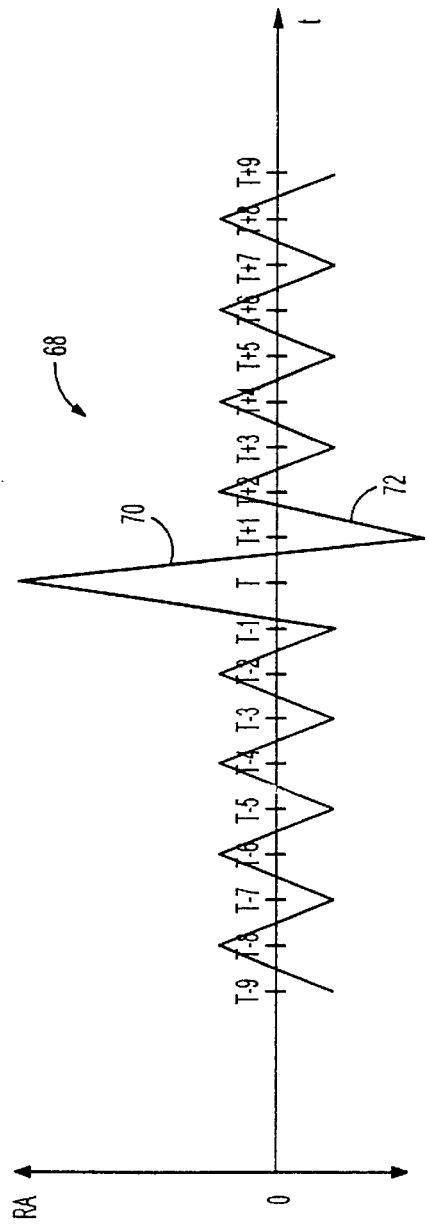

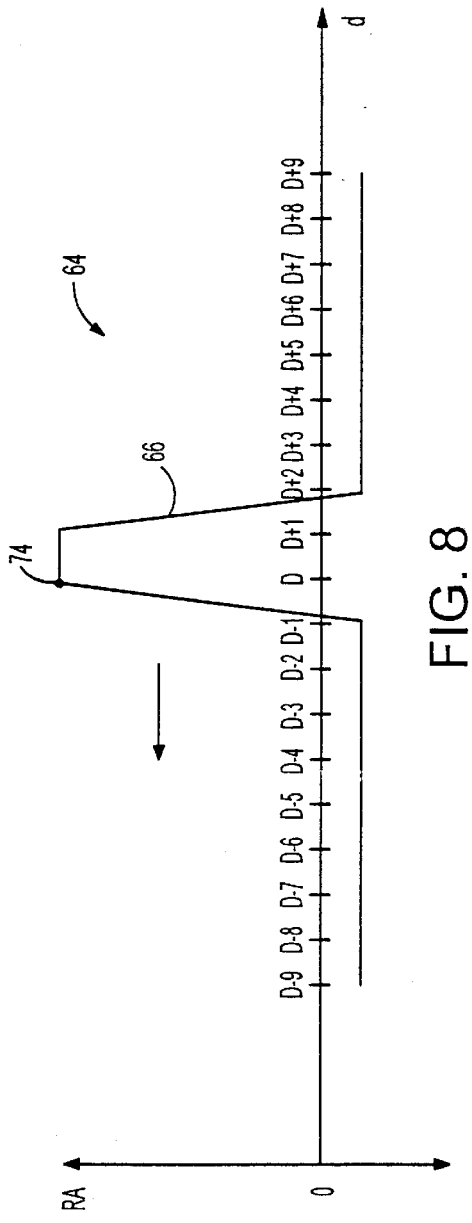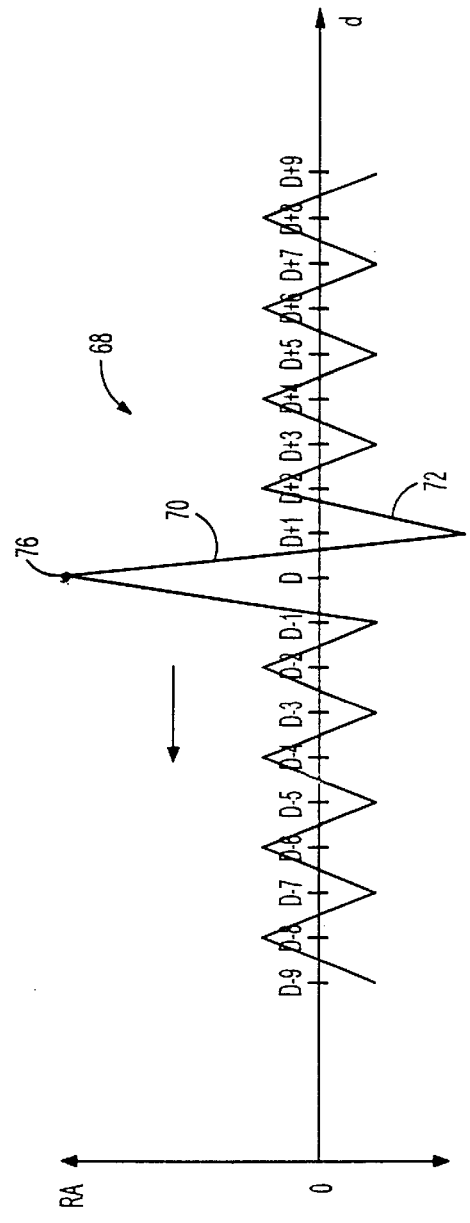

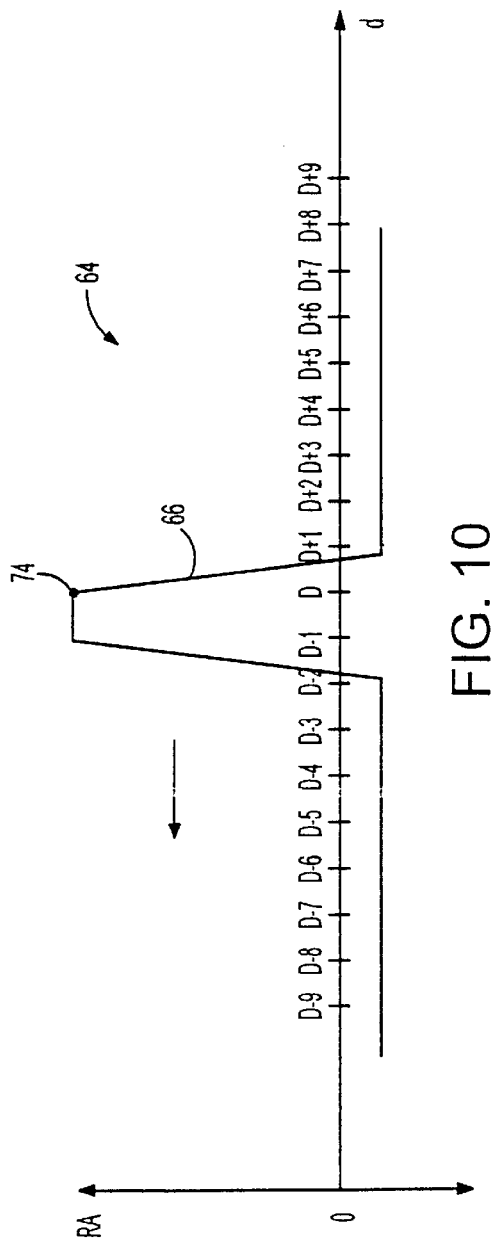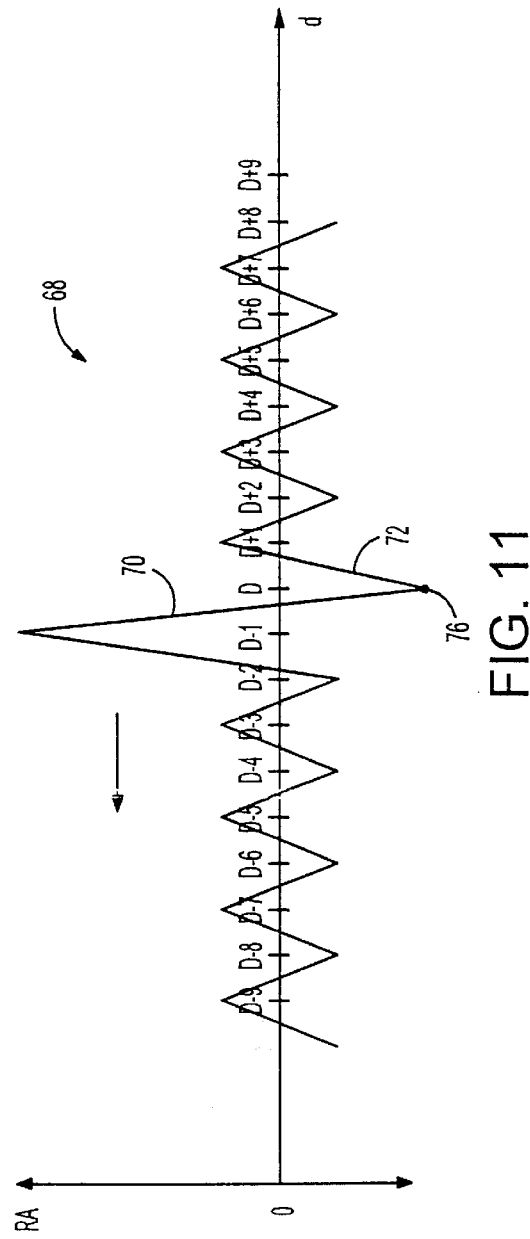

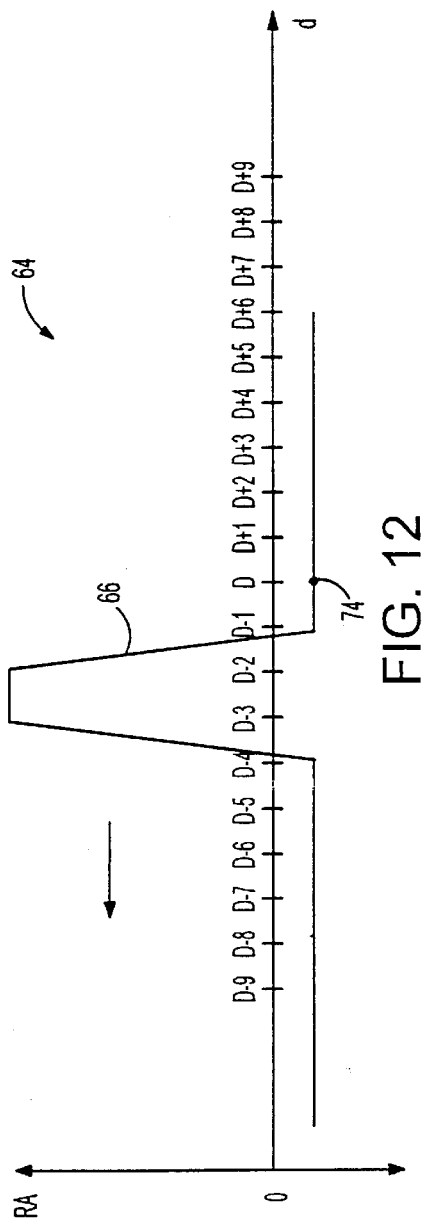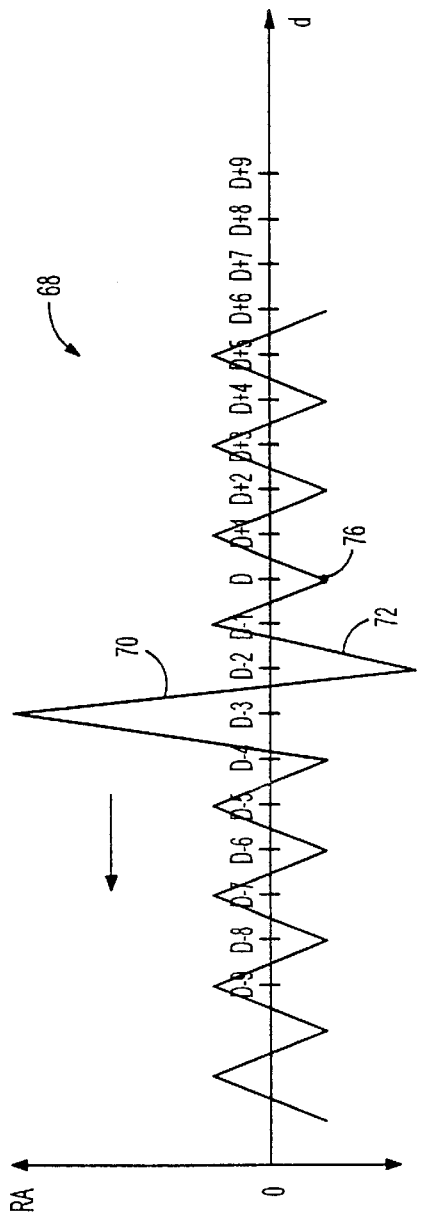
FIG. 12
FIG. 13

CORRELATION BASED OPTICAL RANGING AND PROXIMITY DETECTOR

TECHNICAL FIELD

The invention relates generally to detection and ranging systems and more particularly to an optical detection and ranging system.

DESCRIPTION OF THE RELATED ART

Detection and ranging systems that utilize electromagnetic energy are referred to as (ra)dio (d)etecting (a)nd (r)anging systems, or "radar" systems. Applications of radar systems vary from detecting and ranging of intercontinental ballistic nuclear missiles for national security to detecting and ranging of trout for sports fishing. A radar system can provide an operator with the ability to "see" objects that cannot be perceived though visual means due to limitations of human vision, such as distance, visual obstruction and darkness. In addition, a radar system can function as an extra "eye" to detect objects that breach a predetermined boundary from the location of the radar system. For example, a radar system can be incorporated into a collision avoidance system in an automobile to prevent collisions by detecting any objects within a predetermined proximity of the automobile, allowing an operator to take appropriate steps to avoid the collision.

The basic principles of a radar system are elementary. A transmitter of the radar system emits an electromagnetic signal. The emitted signal is reflected if a target is present at some distance from the radar system. The reflected signal is received by a receiver of the radar system. By calculating the round trip time of the electromagnetic signal, the distance of the target can be determined. However, when noise and interference are introduced into this process, the determination of whether a received signal is the reflected signal of the emitted signal or a signal caused by noise and/or interference becomes difficult. In order to differentiate the desired signal in the presence of noise, a radar system typically emits the signal with an embedded code using discernible differences within the signal, such as phase shifts or frequency changes. The code allows the radar system to correlate the received signal with the emitted signal in order to determine whether the received signal is an echo of the emitted signal, indicating a positive detection of a target.

A common type of radar system that utilizes phase shifts to encode the signal is a pulse compression radar system with binary phase modulation. In these radar systems, the transmitted signal is a pulse that is comprised of a number of subpulses. The subpulses are of equal duration, and each has one of two predetermined phases, wherein the two phases represent digital "0" and "1". The transmitted signals are encoded in a sequence. By correlating a received signal with multiple time-delayed transmitted signals, an autocorrelation function can be plotted as relative amplitude over time. A typical autocorrelation function includes a central peak with sidelobe peaks on both sides of the central peak. The highest relative amplitude value of the central peak indicates a point on the autocorrelation function at which the correlation between the received signal and the transmitted signal is the greatest. The corresponding time of that point is the round trip time required for an emitted pulse to propagate from a radar system to the target and back. A presence of the central peak in the autocorrelation function equates to a positive detection of the target.

A pulse compression technique is an attractive feature for a radar system, because generation of high peak power signals are avoided. Instead, the pulse compression technique utilizes a long pulse with lower power to efficiently apply the average power capability of the system. In the radar system, this long pulse is received and then multiplied by the time-delayed transmitted pulses to efficiently utilize the power of the entire pulse. After the multiplication, the received pulse is integrated and plotted on a display. The length of the pulse determines the ratio between the central peak and the sidelobe peaks. A longer pulse with a greater number of subpulses increases this ratio, which in turn increases the signal-to-noise ratio of the radar system. However, different sequences for the transmitted pulse exhibit different autocorrelation function characteristics. Optimally, a code sequence that produces sidelobes with minimal peaks is desired. However, there are only a limited number of codes that exhibit the desired sidelobe behaviors. Barker codes generate low sidelobes in the autocorrelation function. Unfortunately, the longest Barker code that exhibits the minimum sidelobes behavior is a thirteenth-order code sequence.

Typically, the electromagnetic signals that are transmitted by radar systems are radio frequency (RF) signals. However, optical signals have been utilized instead of RF signals in radar systems. U.S. Pat. No. 5,141,308 to Danckwerth et al. describes a radar system that employs laser beam pulses to detect the presence and range of objects. The radar system of Danckwerth et al. is a pulse compression type radar system that generates the laser beam pulse by a semiconductor laser diode. In operation, the laser beam pulse emitted by the laser is modulated in accordance with a selected code sequence. Portions of the emitted laser beam pulse are reflected back to the system by targets and are received by a photodiode. The photodiode converts light energy of the received pulse to electrical current. The current is demodulated and correlated with the selected code sequence that has been time-delayed. Using the information from the correlation, the range of the target is displayed on a display and counter circuit.

Although prior art systems operate well for their intended purposes, what is needed is a cost-effective detection and ranging system having a high level of effectiveness with respect to rejecting of undesired signal interference and having a reduced system complexity.

SUMMARY OF THE INVENTION

A method and a system for detecting and ranging objects utilize summed and difference signals to determine whether a target is present at a predetermined distance from the system. The summed and difference signals represent corresponding points on two discriminator functions that are derived by summing and subtracting two autocorrelation functions. The two autocorrelation functions are identical functions, except that one has been shifted by a one-bit period. By analyzing the summed and difference signals, the system is able to detect objects that cross a boundary zone located at the predetermined distance from the system. In one application, the invention can be incorporated into an automobile to detect objects, such as other vehicles, within a predefined region surrounding the automobile for back-up sensing, blind spot sensing, and pre-collision detection for vehicle safety systems.

In order to detect the presence of a target, the system includes a transmitter that transmits a unique electromagnetic signal. The system also includes a receiver that is configured to receive the transmitted signal, if the transmitted signal is reflected by the target. Preferably, the transmitter includes a number of optical pulse emitters, such a unique electromagnetic signal is an optical signal. The optical pulse emitters may be laser diodes or high frequency modulated light emitting diodes. Accordingly, the receiver preferably includes a number of photodiodes to receive the reflected optical signal. Each of the optical pulse emitters may be uniquely associated with a particular photodiode. In the preferred embodiment, the transmitter also emits a leader segment prior to transmitting the optical signal. The leader segment is a signal that is utilized by the system to establish an amplitude reference prior to processing the reflected optical signal, thereby controlling any transient effect in the system. The leader segment may be a constant half-powered optical signal. Alternatively, the leader segment may be a series of full-powered pulses separated by spaces to yield an average power equal to half power to establish the amplitude reference.

The transmitted optical signal is modulated by the transmitter in accordance with a binary code having an autocorrelation function with negative sidelobes. The binary code may be a Barker-based code sequence. Preferably, the binary code is a double concatenated eleventh order Barker-based code.

When the reflected optical signal is received by the receiver, the signal is input to a pair of correlators that are connected to a code sequence generator. In the preferred embodiment, the correlator consists of a mixer driven by a bi-polar code sequence matching the transmitted sequence. Upon low pass filtering and with time delay between the sequences, the mixer output will follow the autocorrelation function. The received signal is correlated by the first correlator with a time-delayed version of the binary code that was used to modulate the transmitted optical signal. The first correlator outputs a first autocorrelation signal as a result of the correlation. In parallel, the received signal is also correlated by a second correlator with another time-delayed version of the binary code. However, the time-delayed binary code utilized by the second correlator is further delayed by a one-bit period to generate a second autocorrelation signal. The first and second autocorrelation signals are routed to a summing device and a subtracting device. The summing device produces a summed signal by adding the first and second autocorrelation signals, while the subtracting device produces a difference signal by subtracting the second autocorrelation signal from the first autocorrelation signal.

In one embodiment, a pair of comparators are utilized to threshold the summed and difference signals with the amplitude reference to determine whether the signals are positive or negative with respect to the reference. The thresholded signals are processed by a microcontroller to determine the presence or absence of a target within the boundary zone. In another embodiment, the pair of comparators are replaced by a pair of analog-to-digital (A/D) converters to digitize the summed and difference signals. The digitized signals are then processed by the microcontroller. In the digitization embodiment, detected targets can be ranged within the boundary zone with greater accuracy than the former embodiment.

In the preferred embodiment, the summed and difference signals that are sampled by the microcontroller are averaged signals. In this embodiment, the initial summed and difference signals from the comparators or A/D converters are temporarily stored in a latch/average unit. Next, another optical signal is transmitted, received and cross-correlated. The correlated signals are then summed and subtracted to produce another pair of summed and difference signals. This cycle is repeated until a desired number of summed and difference signals are stored in the latch/average unit. After receiving the desired number of signals, the summed and difference signals are averaged by the latch/average unit for sampling by the microcontroller.

In the most preferred embodiment, the cycles are defined by two types of correlation. In the first type, the binary code that is utilized to modulate the transmission of the optical signals and correlate the received signal is not altered. However, in the second type, the binary code is inverted. Thus, the transmitted optical signal is modulated in accordance with the inverted binary code. Likewise, the received signal is correlated with inverted binary codes that are time-delayed. The two types of correlation are performed in an alternating fashion to minimize any DC offset caused by the first and second correlators.

A detectable perimeter or semi-perimeter around the system can be established by aiming each optical pulse emitter in a particular direction. Each optical pulse emitter will then have an associated boundary zone that is being monitored for targets. A number of boundary zones created by the optical pulse emitters can collectively define the detectable perimeter or semi-perimeter. By systemically transmitting an optical signal from each of the optical pulse emitters, the entire perimeter or semi-perimeter can be monitored for targets.

In a more complex system, the microcontroller analyzes subsequent summed and difference signals to determine the moving direction of a detected target. By adjusting the time delay of the delayed binary codes that are fed into the first and second correlators, the target can be tracked by the system. In essence, the adjustment of the delayed binary code is effectively varying the distance of a boundary zone from the system that is being monitored for targets in order to track the detected target.

An advantage of the invention is that the system is capable of operating against very weak target returns. In addition, the system is insensitive to false detections due to strong signal interference from outside the boundary region. Signal interference may be due to internal signal cross-talk, scattering of the transmit beam or from strong signal returns from high gain retro-reflectors from outside the range measurement region. The use of the double concatenated eleventh order Barker code along with receiver signal processing provide superior rejection of undesired signal interference through time delay selective signal amplification and noise reduction. Less sensitivity to interference sources reduce system cost and result a smaller package due to simplified packaging constraints to accommodate electronic shielding and optical backscatter. The double concatenated eleventh order Barker code exhibits a strongly peaked autocorrelation function with minimal gain and ripple outside the peak, which allows the receiver signal processing to selectively match the received signal to the transmit sequence over a narrow region of range delay.

BRIEF DESCRIPTION OF THE DRAWINGS

FIG. 2 is a partial autocorrelation function of a double concatenated eleventh order Barker-based code having a central peak centered at t=T.

FIG. 3 is a partial autocorrelation function of a double concatenated eleventh order Barker-based code that has been one-bit delayed with respect to the autocorrelation function of FIG. 2.

FIG. 4 is a sum discriminator function derived from summing of the autocorrelation functions of FIGS. 2 and 3.

FIG. 5 is a difference discriminator function derived from subtraction of the autocorrelation function of FIG. 2 from the autocorrelation function of FIG. 3.

FIGS. 6–13 are illustrations of the sum and difference discriminator functions of FIGS. 4 and 5 as a target moves from outside of a semi-perimeter defined by the proximity detector to inside of the semi-perimeter.

DETAILED DESCRIPTION

Figure 1:
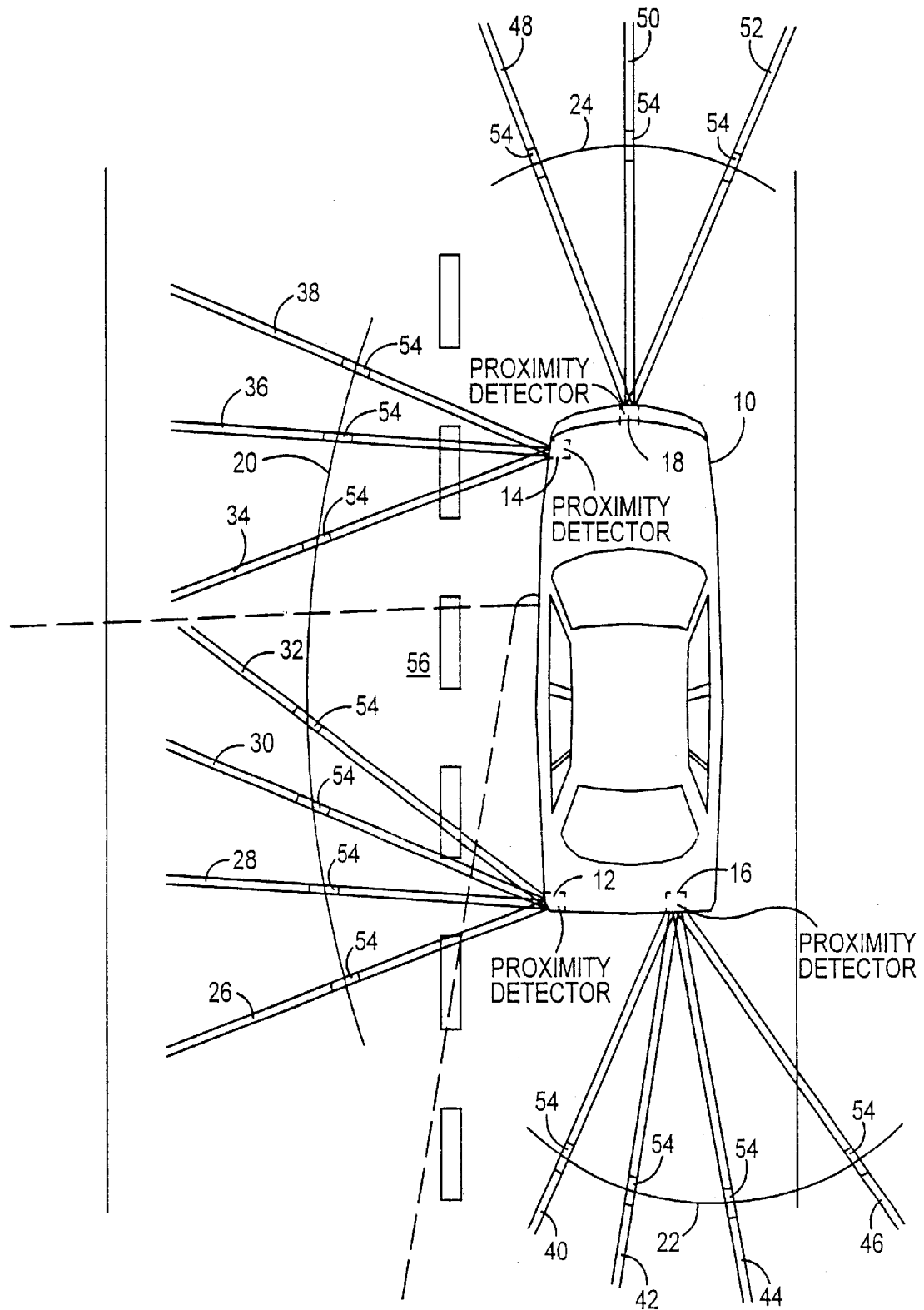
FIG. 1 is an illustration of an automobile embodying a number of proximity detectors in accordance with the present invention.

With reference to FIG. 1, an automobile 10 embodying a number of proximity detectors 12, 14, 16 and 18 in accordance with one application of the invention is shown. The proximity detectors 12–18 can be incorporated into a variety of safety systems that can alert of, prepare for and/or prevent impending collisions with moving or stationary targets, such as other vehicles on the road. The proximity detectors 12–18 are designed to detect targets that breach a particular virtual semi-perimeter established by one of more of the proximity detectors in order to take appropriate pre-collision measures.

The proximity detectors 12 and 14 concurrently operate to establish a virtual semi-perimeter 20, while the proximity detectors 16 and 18 individually operate to establish virtual semi-perimeters 22 and 24, respectively. The virtual semi-perimeter 20 is established by optical paths 26, 28, 30 and 32 that extend from the proximity detector 12 and optical paths 34, 36 and 38 that extend from the proximity detector 14. The virtual semi-perimeter 22 is established by optical paths 40, 42, 44 and 46 that extend from the proximity detector 16, while the virtual semi-perimeter 24 is established by optical paths 48, 50 and 52 that extend from the proximity detector 18. Each of the optical paths 26–52 includes a boundary zone 54 that defines a segment of the virtual semi-perimeters 20, 22 and 24. The boundary zones 54 that are associated with a particular semi-perimeter 20, 22 and 24 define that particular semi-perimeter. The boundary zones 54 of the optical paths 26–38 define the virtual semi-perimeter 20. The boundary zones 54 of the optical paths 40–46 define the virtual semi-perimeter 22, while the boundary zones 54 of the optical paths 48–52 define the virtual semi-perimeter 24. The number of optical paths that are associated with the proximity detectors 12–18 is not critical to the invention. However, each proximity detector 12–18 should utilize a sufficient number of optical paths such that a target cannot enter or leave the virtual semi-perimeters 20–24 without crossing one of the boundary zones 54 of the optical paths.

Detection of a breach by a target across one of the virtual semi-perimeters 20–24 can be utilized in various safety systems embodying one or more of the proximity detectors 12–18. A pre-collision side impact detection system may include the proximity detectors 12 and 14 to deploy or partially deploy side air bags to effectively protect persons riding in the automobile 10 in anticipation of a side impact collision, upon detection of a breach detection across the virtual semi-perimeter 20 by a fast moving target toward the automobile 10. A back-up sensing system may include the proximity detector 16 to alert the driver of the automobile 10 of the close proximity of the automobile 10 to a stationary target during a reverse parking maneuver, upon detection of a breach across the virtual semi-perimeter 22. A car separation system may include the proximity detector 18 to maintain a predetermined distance between the automobile 10 and a vehicle in front by utilizing the detection of a breach across the virtual semi-perimeter 24 by the front vehicle. Other applications of the proximity detectors 12–18 are contemplated. For example, the proximity detector 12 may be utilized in a blind spot detection system. In this system, the proximity detector 12 can be designed to detect a target that breach a portion of the virtual semi-perimeter 20 in a blind spot area 56 to prevent the driver of the automobile 10 from inadvertently, due to lack of visual assessment, colliding with the target when switching lanes.

Although the automobile 10 is shown in FIG. 1 as having only the four proximity detectors 12–18, the automobile 10 may include additional proximity detectors to increase the virtual semi-perimeters 20–24 and/or to incorporate supplementary safety systems in the automobile 10. For example, the automobile 10 may additionally include two proximity detectors located on the right side of the automobile. These additional proximity detectors may establish a virtual semi-perimeter around the right side of the automobile to provide a pre-collision detection of an impending right side impact.

The proximity detectors 12–18 are identical devices which perform a common detecting function. Consequently, the breach detecting operation performed by the proximity detectors 12–18 are identically executed. Therefore, the components of the proximity detector 16 and the breach detecting operation performed by the proximity detector 16 will be described as an exemplary illustration of the proximity detectors 12–18.

The detection of the breach by the proximity detector 16 is accomplished by sequentially emitting pulses of light in the optical paths 40–46 and analyzing received signals. Each of the optical paths 40–46 is associated with an optical emitter (not shown), such as a high frequency modulated light emitting diode or a laser diode, and a photodiode (not shown). The optical emitters transmit the pulses of light along the optical paths 40–46, while the photodiodes receive optical signals, including reflected signals of the transmitted pulses. When a received optical signal is determined to be an echo signal of the emitted light pulse from a target within one of the boundary zones 54 of the optical paths 40–46, a breach of the semi-perimeter 22 is presumed. As will be described below, by further analyzing the received echo signal and subsequent received signals, the proximity detector 16 is able to discriminate the direction of the target. Since the proximity detector 16 only monitors for echo signals from one of the boundary zones 54, rather than a large portion of the optical paths 40–46, the complexity of the proximity detector 16 is significantly reduced.

The proximity detector 16 employs a pulse compression technique with binary phase modulation to determine whether a received optical signal is an echo signal from a target within the boundary zones 54 of the optical paths 40–46. The pulses of light that are transmitted from the optical emitters are modulated in accordance with a selected binary sequence code. Preferably, the selected code has an autocorrelation function having negative sidelobe, as shown in FIG. 2. In addition, the selected code should exhibit minimal sidelobe behavior that has equal ripple characteristics. In the preferred embodiment, the binary sequence code utilized by the proximity detector 16 is a double concatenated eleventh order Barker-based code (hereinafter the "preferred code") having 121 elements. An eleventh order Barker code is "11100010010". The preferred code is formed by replacing a "1" of the eleventh order Barker code with another eleventh order Barker code and replacing a "0" with an inverted eleventh order Barker code to form a 121-element code.

The proximity detector 16 utilizes characteristics of two discriminator functions to determine if a target is within one of the boundary zones 54 of the optical paths 40–46. Using the autocorrelation function of the preferred code, two discriminator functions are derived by either adding or subtracting the autocorrelation function with a one-bit delayed version of the autocorrelation function. The derivation of the two discriminator functions will be described with reference to FIGS. 2–5.

In FIG. 2, a partial autocorrelation function 58 of the preferred code is illustrated. The autocorrelation function 58 is plotted with respect to relative amplitude (RA) over time (t). The autocorrelation function 58 has a central peak 60 centered at t=T and a number of sidelobes on both sides of the central peak. The sidelobes of the autocorrelation function 58 have negative RA values. Referring now to FIG. 3, a partial autocorrelation function 62 is shown. The autocorrelation function 62 is a one-bit delayed version of the autocorrelation function 58. Except for the one-bit delay, the autocorrelation function 62 is identical to the autocorrelation function 58. Essentially, the central peak 60 and the sidelobes have been shifted one time increment to the right. On the autocorrelation function 62, the central peak 60 is situated at t=T+1, whereas the central peak 60 of the autocorrelation function 58 is situated at t=T.

The first discriminator function is derived by adding the autocorrelation function 58 and the autocorrelation function 62. The result of the summing of the two autocorrelation functions 58 and 62 is a sum discriminator function 64, shown in FIG. 4. The sum discriminator function 64 has a sum peak 66 between a central region defined by t=T−1 and t=T+2. Outside of this central region, the sum discriminator function 64 is negative.

The second discriminator function is derived by subtracting the autocorrelation function 60 from the autocorrelation function 58. In FIG. 5, a difference discriminator function 68 is shown. The difference discriminator function 68 is the result of the subtraction of the autocorrelation functions 58 and 60. The difference discriminator function 68 includes a major positive peak 70 at t=T and a major negative peak 72 at t=T+1. The major positive and negative peaks 70 and 72 are situated between t=T−1 and t=T+2. The difference discriminator function 68 also includes a number of sidelobes. The peaks of these sidelobes have positive RA values.

The proximity detector 16 is able to utilize the characteristics of the sum and difference discriminator functions 64 and 68 to determine whether a target has crossed one of the boundary zones 54 of the optical paths 40–46. The proximity detector 16 generates a sum signal that represents a point on the sum discriminator function 64. Simultaneously, the proximity detector 16 generates a difference signal that represents a corresponding point on the difference discriminator function 68. The points represent the distance between the proximity detector 16 and the intersection of the semi-perimeter 22 in one of the optical paths 40–46. The components of the proximity detector 16 that generate the sum and difference signals will be described below.

The optical path 40 is chosen to describe the detection of a target within the boundary zones 54 of the optical paths 40–46. The sum and difference functions 64 and 68 may represent a situation in which a surface of a target is within the boundary zone 54 of the optical path 40 during the time period between t=T−1 and t=T+2. The sum and difference signals generated by the proximity detector 16 will represent the sum and difference functions 64 and 68 at t=T. As the target approaches or moves away from the proximity detector 16, crossing the boundary zone 54 of the optical path 40, the sum and difference discriminator functions 64 and 68 will shift along the t axis. However, the shapes of the functions 64 and 68 will remain the same. When the target is approaching the proximity detector 16, the discriminator functions 64 and 68 will move to the left. Conversely, when the target moves away from the proximity detector 16, the discriminator functions 64 and 68 will move to the right.

The sum and difference signals that are utilized by the proximity detector 16 as the target approaches the proximity detector 16 will be described with reference to FIGS. 6–13. In FIGS. 6–13, the discriminator functions 64 and 68 are plotted as relative amplitude (RA) over distance (d). The distance D represents a distance from the proximity detector 16 to a point within the boundary zone 54 in which the time required for a light pulse to traverse twice the distance D equals time T of FIGS. 2 and 3. Therefore, the sum and difference signals that are utilized by the proximity detector 16 are at d=D. The boundary zone 54 of the optical path 40 is within the a critical region defined by d=D−1 and d=D+2.

Figure 6:
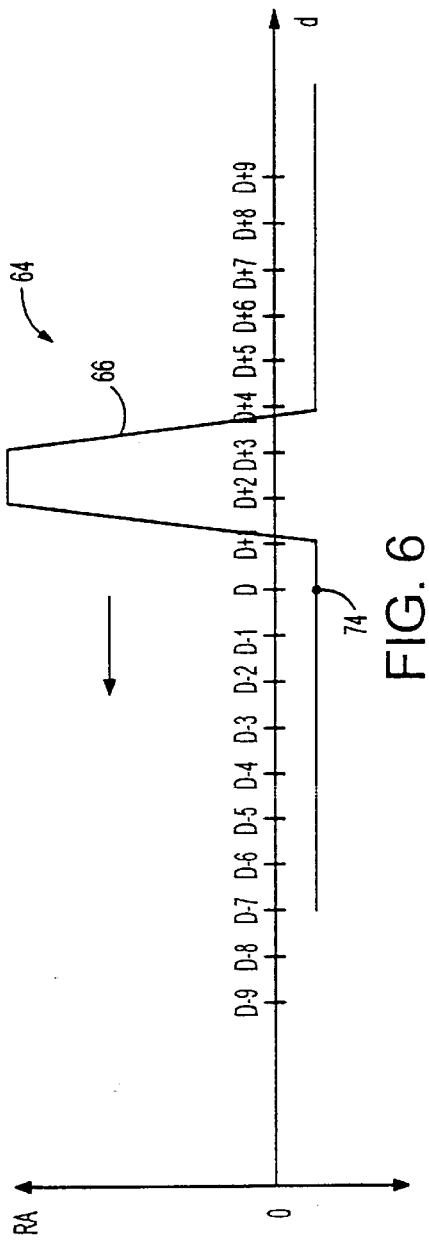
Figure 7:
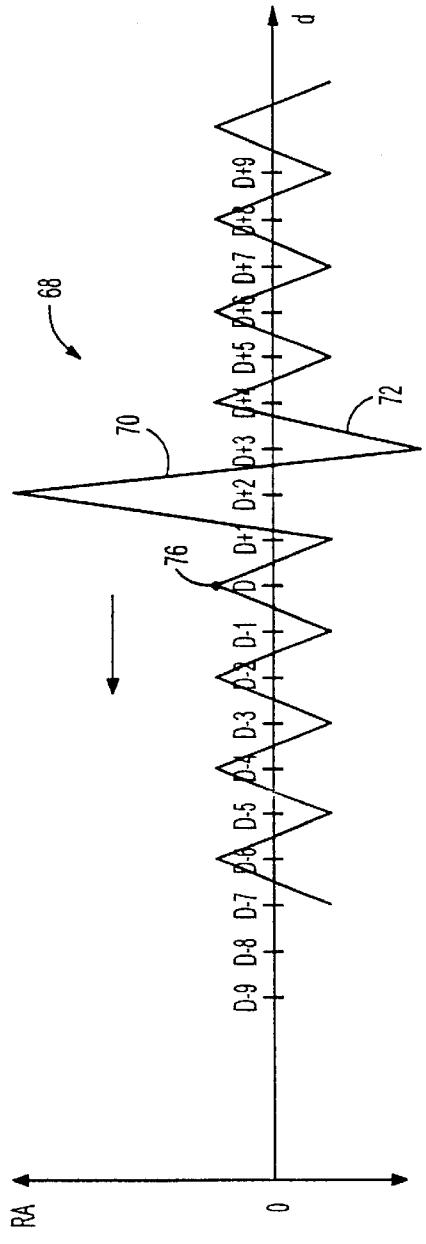

With regard to FIGS. 6 and 7, the target is further away from the proximity detector 16 than the boundary zone 54 of the optical path 40. This is apparent because the sum peak 66 of the discriminator function 64 and the major positive peak 70 of the discriminator function 68 are to the right of the critical region on the d axis. However, the proximity detector 16 only senses a sum signal 74 and a difference signal 76 at d=D. The sum signal 74 is negative, while the difference signal 76 is positive. Since the sum discriminator function 64 is negative outside the sum peak 66, the sum signal 74 can be utilized to mask the fluctuating difference signal 76 due to sidelobes of the difference discriminator function 68. Therefore, as long as the sum signal 74 is negative, the target can be assumed to be outside the boundary zone 54 of the optical path 40.

As soon as the target crosses into the boundary zone 54 of the optical path 40 from outside the semi-perimeter 22, the sum signal 74 and the difference signal 76 jump to high positive RA values, as shown in FIGS. 8 and 9. As the target gets a little closer to the proximity detector 16, the sum signal 74 remains positive, while the difference signal 76 dives to a large negative RA value, as shown in FIGS. 10 and 11. This change in the difference signal 76 indicates that the target is approaching the proximity detector 16. When the target gets even closer, the sum signal 74 returns to a negative RA value which masks the difference signal 76, indicating that the target is not within the boundary zone 54 of the optical path 40, as shown in FIGS. 12 and 13.

When the target enters the boundary zone 54 of the optical path 40 while moving away from the proximity detector 16, the RA values of the sum and difference signals 74 and 76 change in the opposite manner as when the target was approaching the proximity detector. Initially, the sum signal 74 is negative, indicating that the target is not within the boundary zone 54 of the optical path 40. As the target enters the boundary zone 54 of the optical path 40 from within the semi-perimeter 22, the RA value of the sum signal 74 jumps to a large positive value. In addition, the RA value of the difference signal 76 dives to a large negative value. When the target moves further away from the proximity detector 16, the difference signal 76 inverts from a negative signal to a positive signal. This change of the difference signal 76 from a negative signal to a positive signal, while the sum signal 74 remains positive, indicates that the target is crossing the boundary zone 54 of the optical path 40 as the target moves away from the proximity detector 16. In contrast, when the difference signal 76 changes from a positive signal to a negative signal while the sum signal 74 remains positive, this is an indication that the target is crossing the boundary zone 54 of the optical path 40 as the target is approaching the proximity detector 16. The proximity detector 16 is able to detect a target that enters the boundary zone 54 of the optical path 40 and to determine the moving direction of the target by using the characteristics of the two discriminator functions 64 and 68.

Figure 14:
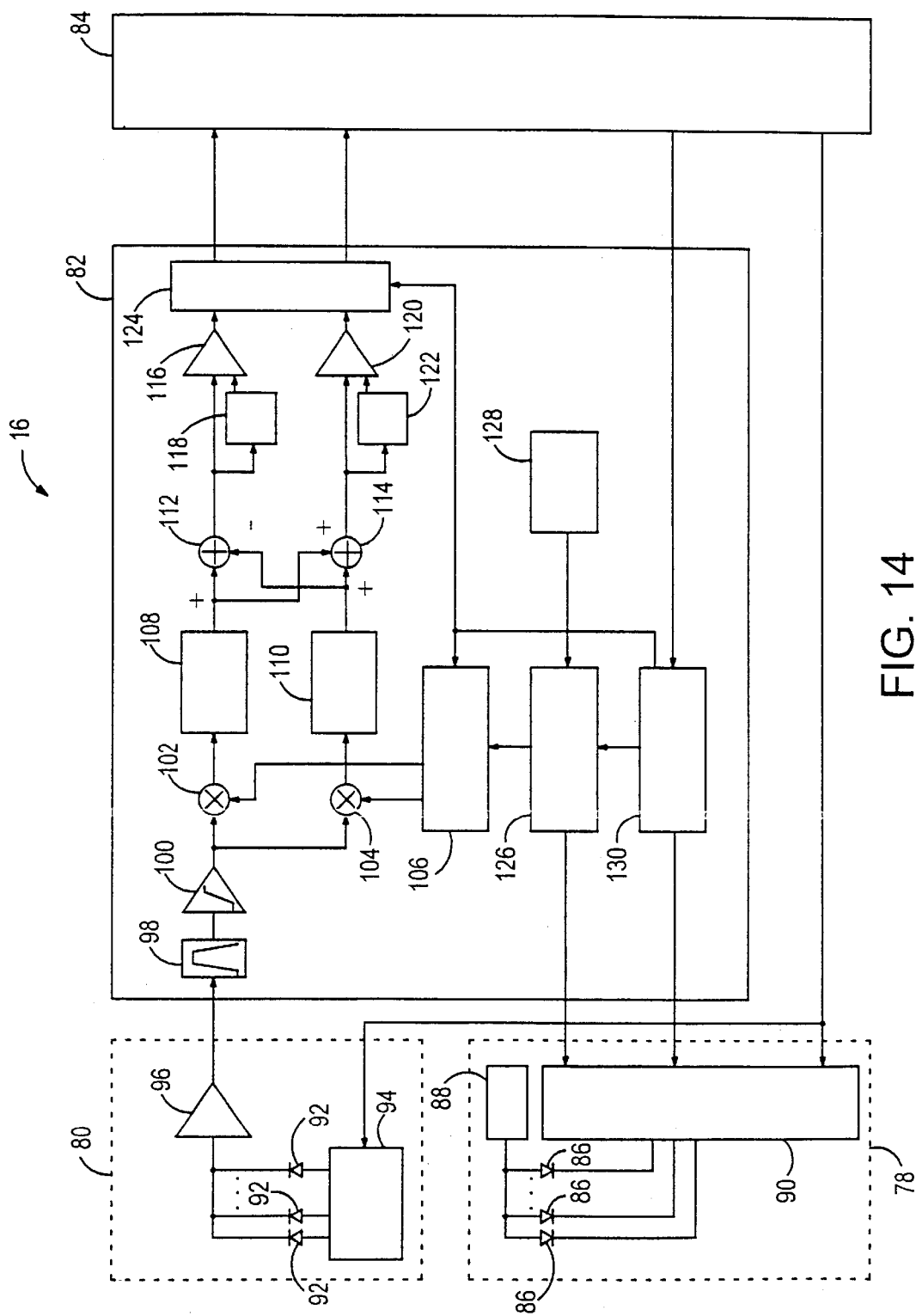
FIG. 14 is a block diagram of the components of the proximity detector in accordance with the present invention.

Turning now to FIG. 14, the components of the proximity detector 16 are shown. The proximity detector 16 includes transmitter circuitry 78, receiver circuitry 80, a transmit/receive processor 82 and a microcontroller 84. The transmitter circuitry 78 contains a number of light emitters 86, a power supply 88 and a transmit driver 90. The light emitters 86 may be laser diodes or high frequency modulated light emitting diodes (LEDs). The exact number of light emitters 86 is not critical to the invention. The transmit driver 90 operates to select a light emitter 86 in response to a selected signal from the microcontroller 84 and to active the selected light emitter in accordance with a coded transmit signal from the transmit/receive processor 82. The selected light emitter 86 transmits an optical signal containing the coded transmit signal that will be utilized by the proximity detector 16 to detect and range a target.

The receiver circuitry 80 contains a number of photodiodes 92, a photodiode selector 94 and a preamp 96. The number of photodiodes 92 should correspond to the number of light emitters 86 in which each photodiode 92 is operatively associated with a unique light emitter 86. The photodiode selector 94 operates to select an associated photodiode 92 in response to the select signal from the microcontroller 84. The selected photodiode 92 converts any received light signal into electrical current. The received light signal may include a reflected version of the transmitted optical signal from the selected light emitter 86. The photodiode-generated current travels to the transmit/receive processor 82 via the preamp 96. The preamp 96 transforms the small signal current from the selected photodiode 92 into a highly amplified voltage signal. The expected current-to-voltage gain (transimpedance) ranges from ten to twenty thousand, depending on the specifications of the photodiode 92 and preamp 96.

The transmit/receive processor 82 includes a bandpass filter 98 and a limiting amplifier 100 that are connected in series to shape the amplified signal from the preamp 96 of the receiver circuitry 80. The output of the limiting amplifier 100 is connected to a pair of mixers 102 and 104. The mixers 102 and 104 are also connected to a receiver correlation sequence (RCS) generator 106 that provides delayed versions of the transmitted code, i.e., the preferred code. Preferably, the preferred code is stored in a read-only memory (not shown) within the RCS generator 106. However, the mixer 104 is configured to receive the transmitted code from the RCS generator 106 that is further delayed by a one-bit period as compared to the delayed transmitted code received by the mixer 102. These two delayed codes are needed to generate signals that correspond to two different autocorrelation functions, similar to the functions 58 and 60 in FIGS. 2 and 3. The two delayed codes are transmitted to the mixers 102 and 104 as signals. These code signals are received by the mixers 102 and 104 and then multiplied by the output signal of the limiting amplifier 100. The two multiplied signals from the mixers 102 and 104 are transmitted to correlation filters 108 and 110, respectively. The correlation filters 108 and 110 integrate the multiplied signals from the mixers 102 and 104.

Next, both integrated signals from the filters 108 and 110 are relayed to a subtracting device 112 and a summing device 114. The subtracting device 112 determines the difference between the signal from the filter 108 and the signal from the filter 110, while the summing device 114 determines the sum of the two signals. The subtracting device 112 outputs a difference signal to an input of a comparator 116. The comparator 116 also receives a filtered difference signal from a low pass filter 118. The low pass filter 118 receives the difference signal from the subtracting device 112 and outputs the filtered signal to the comparator 116. The filtered difference signal includes low frequency noise caused by the mixers 102 and 104 during the multiplying operations. Similarly, the summing device 114 outputs a summed signal to a comparator 120 and a low pass filter 122. The low pass filter 122 filters the summed signal and provides a filtered summed signal to the comparator 120. The comparators 116 and 120 eliminate the low frequency noise by subtracting the noise from the summed and difference signals. The comparators 116 and 120 then transmit the difference and summed signals that have been noise-compensated to a latch/average unit 124. The latch/average unit 124 receives the difference and summed signals and subsequent difference and summed signals from the following transmitted optical signals. These signals are then averaged by the latch/average unit 124 for a prescribed period. The averaged difference and summed signals are sampled by the microcontroller 84 at the end of the prescribed period. By analyzing the two averaged signals, the microcontroller 84 is able to detect a target within one of the boundary zones 54 of the optical paths 40–46. In an alternative configuration, the low pass filter 118 and the comparator 116 are replaced by a first analog-to-digital (A/D) converter and the low pass filter 122 and the comparator 120 are replaced by a second A/D converter. In this configuration, the A/D converters are able to capture the strength of the summed and difference signals to provide additional information for processing by the microcontroller 84. The microcontroller 84 may utilize the strength of the signals to accurately determine the location of the detected target within the boundary zone.

The transmit/receive processor 82 also includes a transmit correlation sequence (TCS) generator 126 that is coupled to a master clock 128 and a state controller 130 that is coupled to the microcontroller 84. The TCS generator 126 provides either the preferred code, i.e., the double concatenated eleventh order Baker code, or an inverted version of the preferred code to the transmit driver 90 of the transmitter circuitry 78 in order to modulate the transmitting optical signal. Preferably, the TCS generator 126 includes a read-only memory (not shown) that is programmed with the preferred code. The master clock 128 provides a clock signal to synchronize the transmission of the optical signal and the correlation process. The clock signal is utilized by the TCS generator 126 to transmit the normal or inverted preferred code to the transmit driver 90. In addition, the RCS generator 106 utilizes the clock signal to transmit delayed versions of the transmitted code to the mixers 102 and 104. The time delay adjustment between the transmit and receive correlation sequences can be accomplished by a programmable phase shifter to provide time delay adjustment over a single clock cycle and a delay counter to allow time adjustment over multiple cycles of the master clock. In a more complex configuration, the delay of transmitted signals from the RCS generator 122 to the mixers 102 and 104 are controlled by the microcontroller 84 to track a detected target by effectively varying a boundary zone within an optical path of the transmitted optical signal. The boundary zone is moved further away from the proximity detector 16, if the microcontroller 84 determines that the detected target is moving away from the detector 16. Conversely, the boundary zone is moved closer to the proximity detector 16, if the detected target is approaching the proximity detector 16.

The state controller 130 operates to invert the transmitted signals from the TCS generator 126 and from the RCS generator 106, as well as the summed and difference signals received by the latch/average unit 124. The inversion of the signals is desired to offset noise generated by the mixer 102 and 104. In addition, the state controller 130 is designed to activate the transmit driver 90 of the transmitter circuitry 78 to attach a leader segment to each optical signal generated by one of the light emitters 86.

In radar systems using radio frequency (RF) signals, the transmitted signals are typically modulated using orthogonal two phase coding which multiplies the bipolar correlation codes by a higher frequency sinusoid. Typically, this modulation is at least twice the fundamental frequency of the code sequence. This has an advantage in radar systems, since the signal spectrum must be narrowed and moved away from DC to allow transmission. Also in RF radar systems, the bipolar wave shape can be transmitted as long as coherent detection is performed. However, for an optical radar system, such as the proximity detector 16, using incoherent modulation and detection, only uni-polar information can be transmitted. Furthermore, due to LED modulation bandwidth limitations, it is undesirable to up-convert the signal as in the RF radar systems. Therefore, the approach of the proximity detector 16 is to transmit the digital code, i.e., the transmitted optical signal, at baseband instead of up-converting the signal. This allows the reduction of LED and receiver bandwidth requirements. To transmit the code directly, the low frequency cut-off must be close to DC to minimize bias level shift during the convolution bit sequence. Based on the use of the eleventh order barker code with a bit period of approximately 30 nanoseconds, a low frequency cut-off of 200 Khz is necessary to maintain good pulse shape throughout the burst. Unfortunately, the low frequency cutoff also produces a significant start-up error in the waveform bias level, as shown in FIG. 15.

Figure 15:
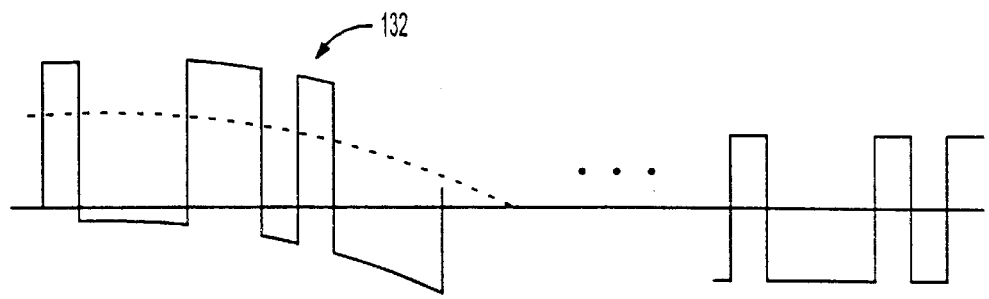
FIG. 15 is an illustration of the effect of a start-up transient on a received waveform that does not include a leader segment.

In FIG. 15, a start-up transient in a received waveform 132 is shown. Since the portion of the waveform 132 that is affected contains a segment of the code sequence, the correlation of the received waveform 132 to a reference signal will be affected. To reduce the effect of the starting transient, the transmitter circuitry 110 operate to transmit an unmodulated half-amplitude signal in front of the modulated waveform, i.e., the preferred code, to establish a zero amplitude reference prior to the burst transmission. The unmodulated half-amplitude signal will be referred to as the "leader segment."

Figure 16:
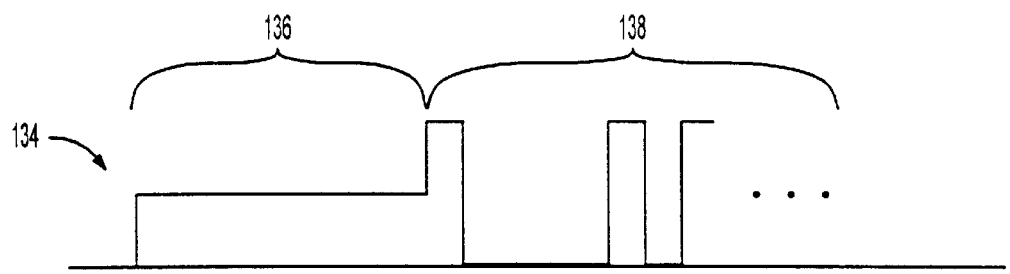
FIG. 16 is a transmitted optical signal having a leader segment in accordance with a first embodiment of the invention.
Figure 17:
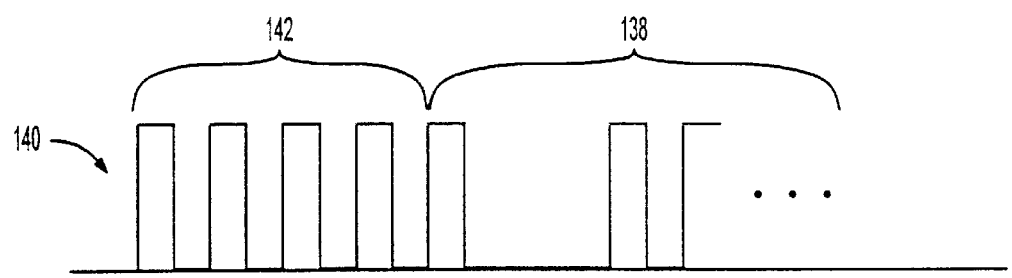
FIG. 17 is a transmitted optical signal having a leader segment in accordance with a second embodiment of the invention.
Figure 18:
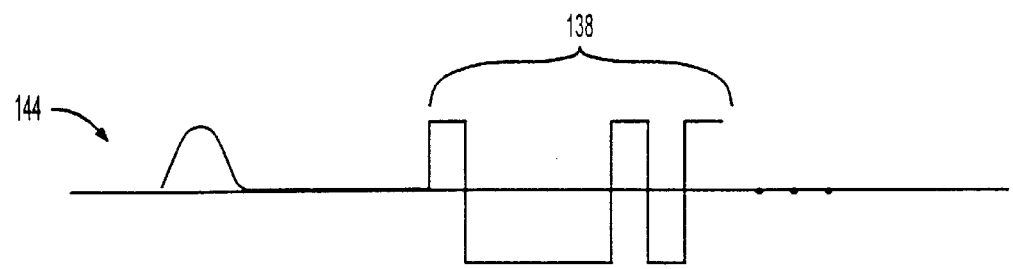
FIG. 18 is an illustration of the effect of a start-up transient on a received optical signal of FIGS. 16 and 17.

Turning to FIG. 16, a transmitted optical signal 134 having a leader segment 136 in accordance with a first embodiment is shown. The optical signal 134 also includes a code sequence 138 that embodies the preferred code. The leader segment 136 is a constant half-powered optical signal. In FIG. 17, another transmitted optical signal 140 having a leader segment 142 and the code sequence 138 in accordance with a second embodiment is shown. In this embodiment, the leader segment 142 is a series of full-powered optical pulses separated by spaces to yield an average power equal to half of the full-powered optical pulses to establish the amplitude reference. The required length of the leader segments 136 and 142 is dependent on the low frequency cut-off of the bandpass filter 98. The effect of the leader segments 136 and 142 is illustrated in FIG. 18. FIG. 18 shows a received optical signal 144, i.e., one of the optical signals 134 and 140. The code sequence 138 of the received optical signal 144 is hardly affected by the start-up transient. Thus, the leader segments 136 and 142 is able to reduce the effects of the start-up transient on the code sequence 138.

In operation, the microcontroller 84 sends a select signal to the transmit driver 90 and the photodiode selector 94 to select a particular light emitter 86 and an associated photodiode 92. The microcontroller also sends a start signal to the state controller 126. The state controller 126 transmits a control signal to the transmit driver 90 to send the leader segment of an optical signal. The transmit driver 90 activates the selected light emitter 86 to optically send the leader segment. At the end of the lead segment, the TCS generator 126 transmits the preferred code to the transmit driver 90 in response to the state controller 130. Depending upon the current cycle, the state controller 130 will determine whether the preferred code is to be inverted prior to transmission of the preferred code to the transmit driver 90. Assuming that the current cycle calls for a non-inverted, preferred code, the selected light emitter 86 is driven by the transmit driver 90 to optically transmit the preferred code.

The optical signal from the selected light emitter 86 propagates in a predetermined optical path away from the proximity detector 16. The optical signal impinges upon a target and is reflected back to the proximity detector 16. The reflected optical signal along with any optical noise is received by the associated photodiode 92. The photodiode 92 generates current in response to the received optical signal. The generated current is then amplified by the preamp 96 and transmitted to the bandpass filter 98 of the transmit/receive processor 82. The leader segment of the optical signal causes a start-up transient. After the start-up transient, the zero amplitude reference is established. The coded segment of the optical signal is filtered by the bandpass filter 98 and then amplified by the limiting amplifier 100. The filtered and amplified coded signal is inputted into the mixers 102 and 104. The coded signals are multiplied by delayed versions of the transmitted code that are provide by the RCS generator 106. The RCS generator 106 utilizes the clock signal from the master clock 128 to provide the delayed versions of the preferred code. However, the delayed code to the mixer 104 is further delayed by a one-bit period as compared to the delay code to the mixer 102. The mixers 102 and 104 transmit multiplied signals to the correlation filters 108 and 110, respectively, where the multiplied signals are integrated.

The integrated signals from the correlation filters 108 and 110 are then relayed to the subtracting device 112 and the summing device 114. The two integrated signals are summed by the summing device 114, while the integrated signal from the correlation filter 108 is subtracted by the integrated signal from the correlation filter 110 by the subtracting device 112. The summed signal is then transmitted to the low pass filter 122 and the comparator 120, where the noise in the summed signal is reduced. Similarly, the difference signal is transmitted to the low pass filter 118 and the comparator 116, where the noise in the difference signal is also reduced. The noise-reduced summed and difference signals are outputted to the latch/average unit 124, completing one correlation process within a series of correlations.

In a following correlation process, the same light emitter 86 and same photodiode 92 are activated to detect and range a target. However, during this cycle, the state controller 130 operates to invert the transmitted signal from the TCS generator 126 to the transmit driver. In addition, the delayed code transmitted from the RCS generator 106 to the mixers 102 and 104 is inverted. Furthermore, the summed and difference signals from the comparators 116 and 120 are inverted within the latch/average unit 124. During the next cycle, the state controller 130 ensures that the transmitted signals from the TCS and RCS generators 126 and 106 and the summed and difference signals received by the latch/average unit 124 are again inverted. The correlation processes are performed in this alternating fashion until a sufficient amount of summed and difference signals are captured and averaged by the latch/average unit 124, completing a single sampling period. The averaged difference and summed signals are sampled by the microcontroller 84 at the end of this single sampling period. As an example, thirty correlation processes may be performed during the single sampling period. Similar correlation processes are then repeated for each pair of light emitter 86 and photodiode 92 to detect any targets within other boundary zones being monitored by the proximity detector 16.

Figure 19:
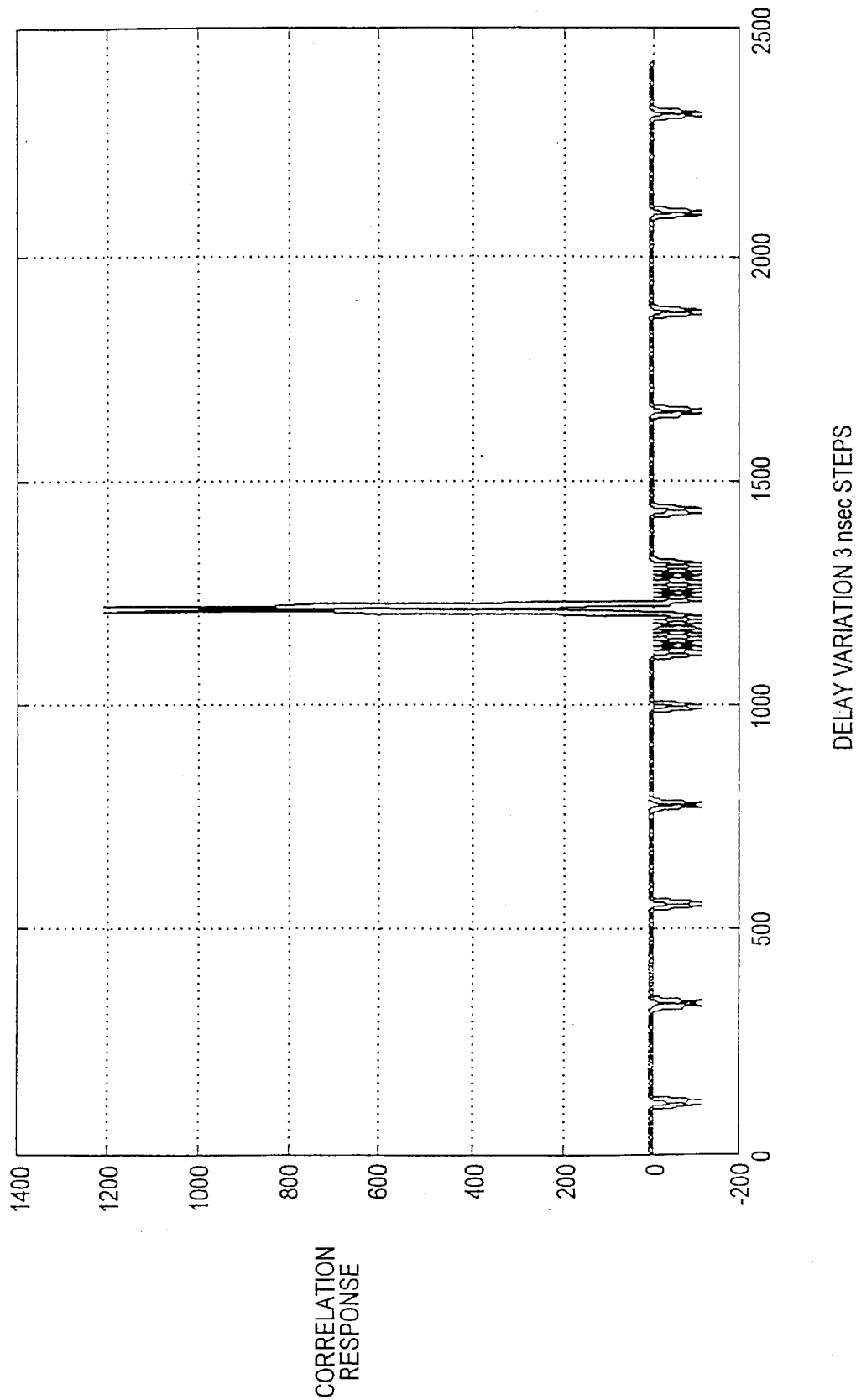
FIGS. 19–26 are illustrations showing results of simulations under various conditions.
Figure 20:
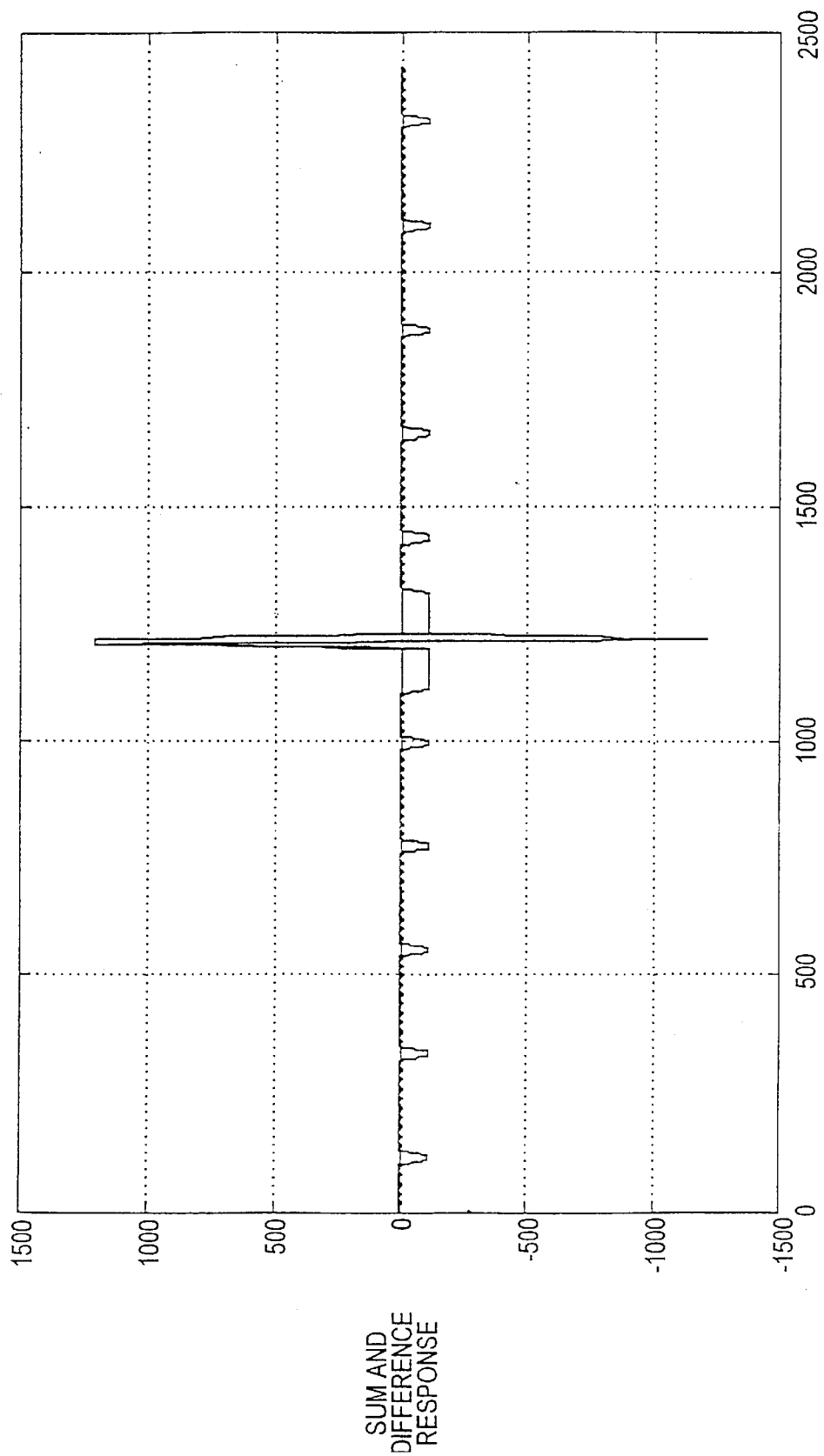
Figure 21:
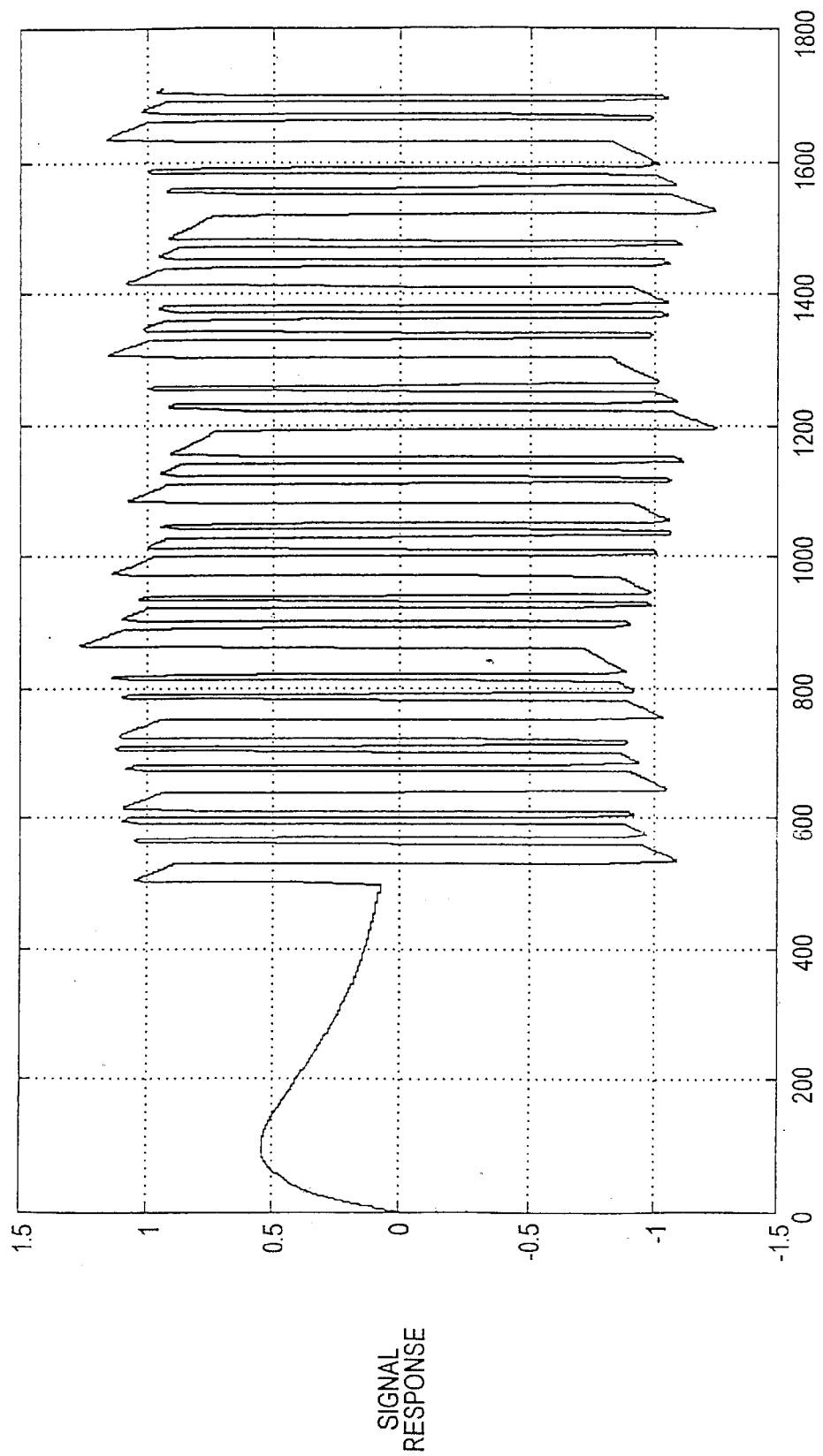

FIGS. 19–26 show results of simulations under various conditions. FIG. 19 is a superimposed result of the ideal autocorrelation functions of two double concatenated eleventh order Barker-based codes, i.e., the preferred codes, with and without a one code bit delay. The simulation was made using Barker sequence without filtering and noise injection. This code exhibited negative sidelobes for 13 bit cycles on either side of the central lobe as with the eleventh order sequence. The ratio between the autocorrelation peak and the sidelobe ripple is the same as the eleventh order case. FIG. 20 shows the sum and difference of autocorrelation functions of FIG. 19. FIG. 21 shows the output of the receiver bandpass filter for the double concatenated eleventh order Barker sequence with a half value leader segment added. The transmit correlation sequence is lowpass filtered with a 20 MHz cut-off frequency to simulate the effect of the LED's bandwidth limitation. The signal is bandpass filtered with a passband from 200 kHz to 50 MHz. No noise has been added. The leader segment is sufficiently long to allow the decay of the leading transient response before the start of the correlation sequence.

Figure 22:
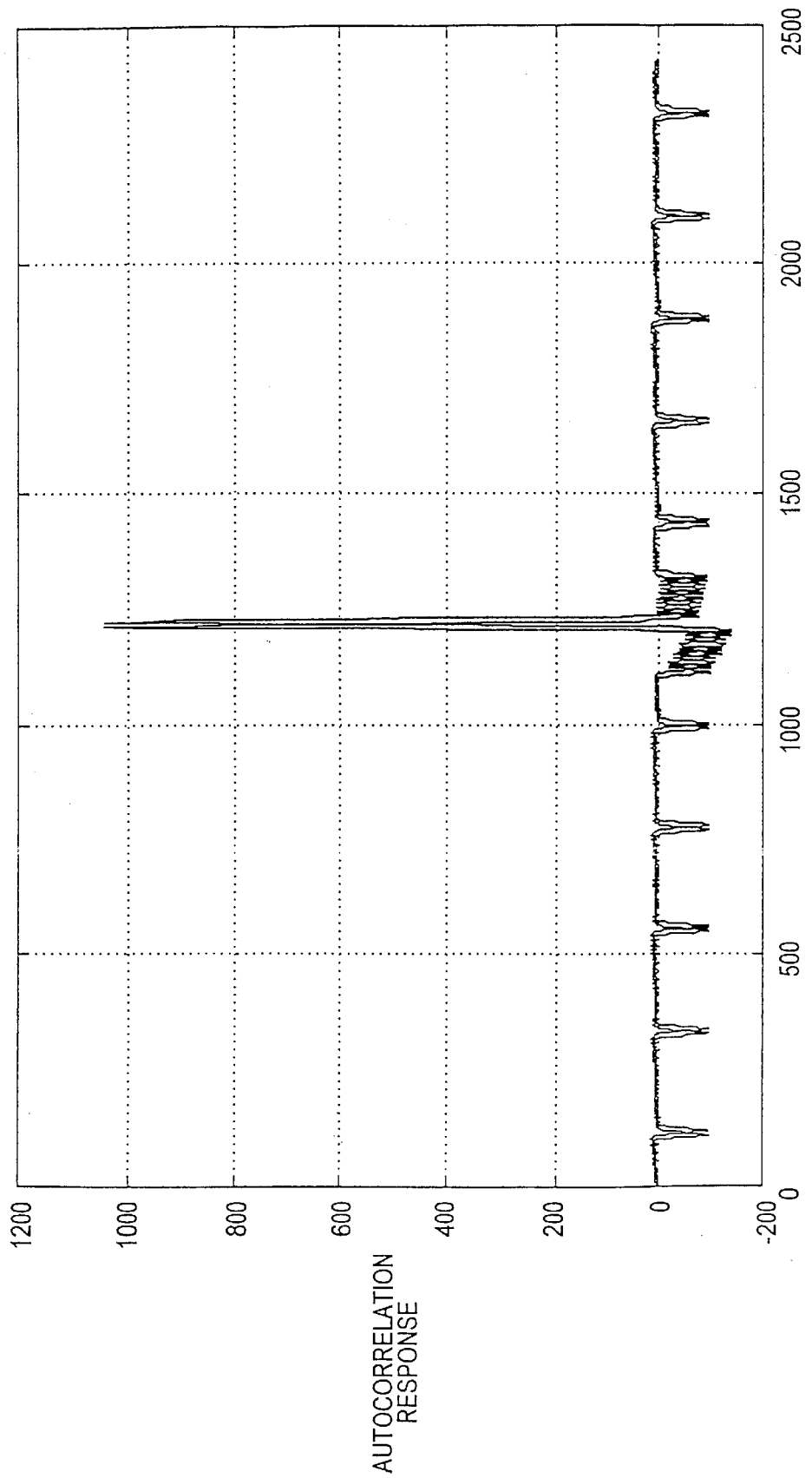
Figure 23:
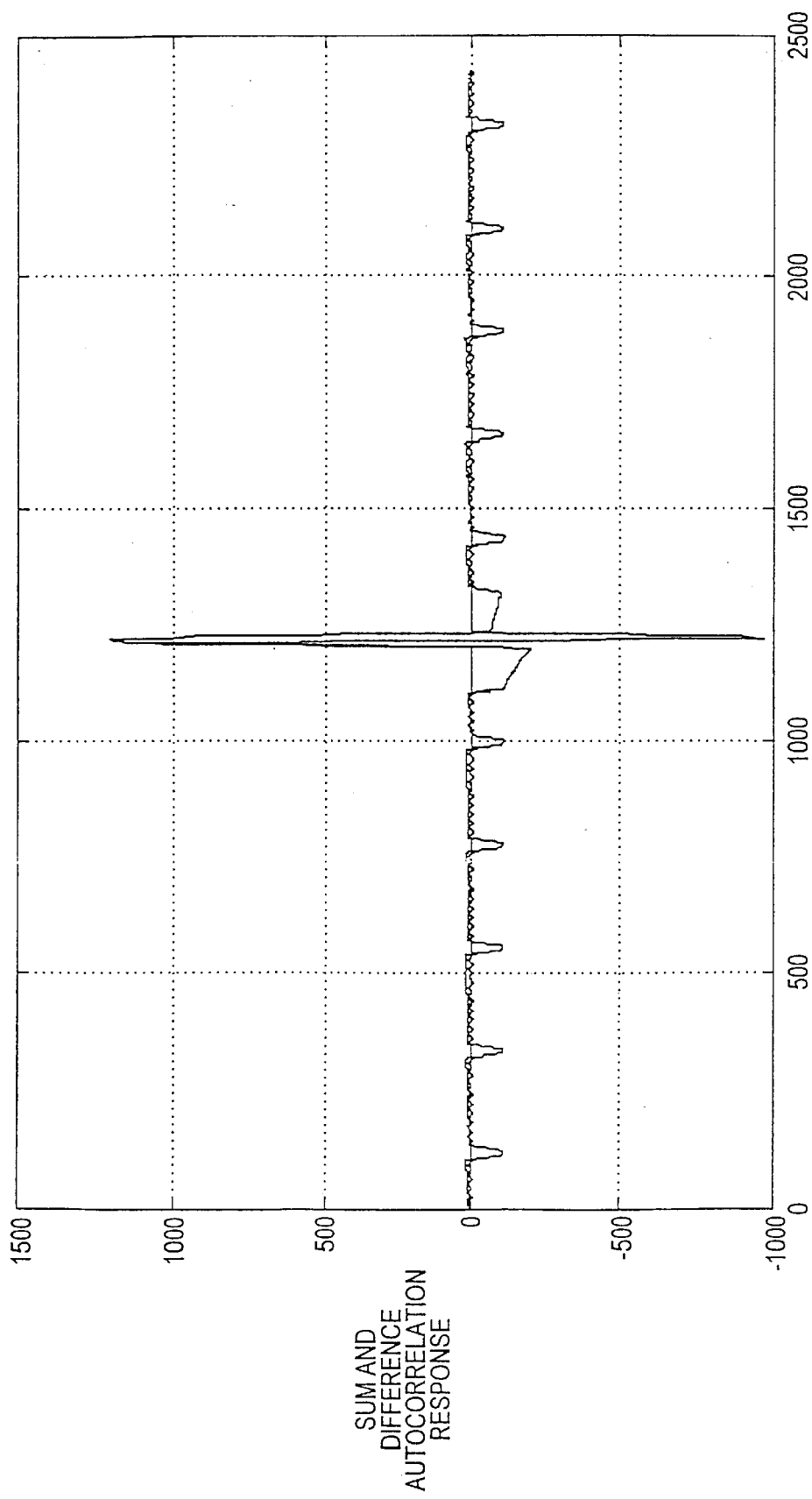
Figure 24:
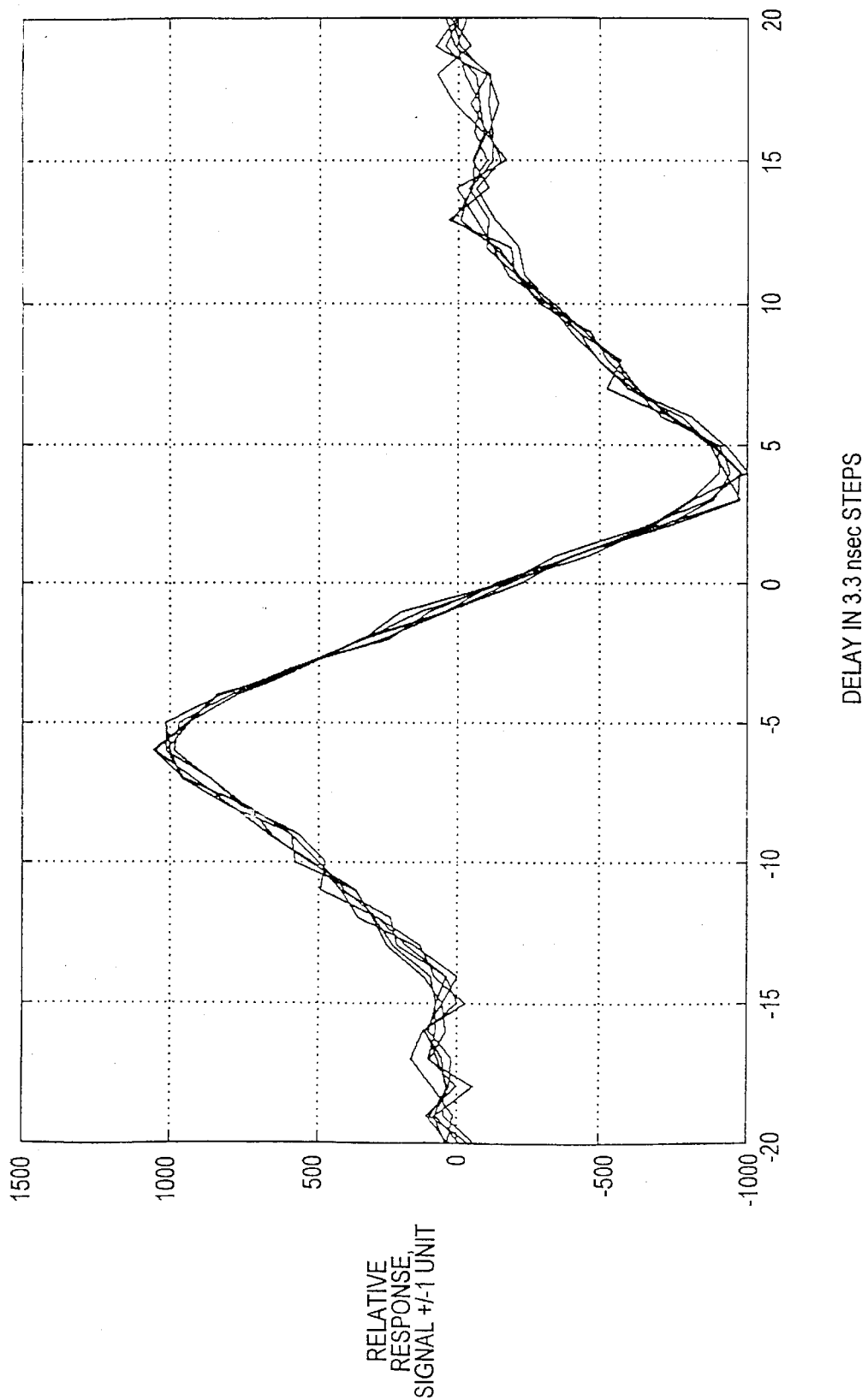
Figure 25:
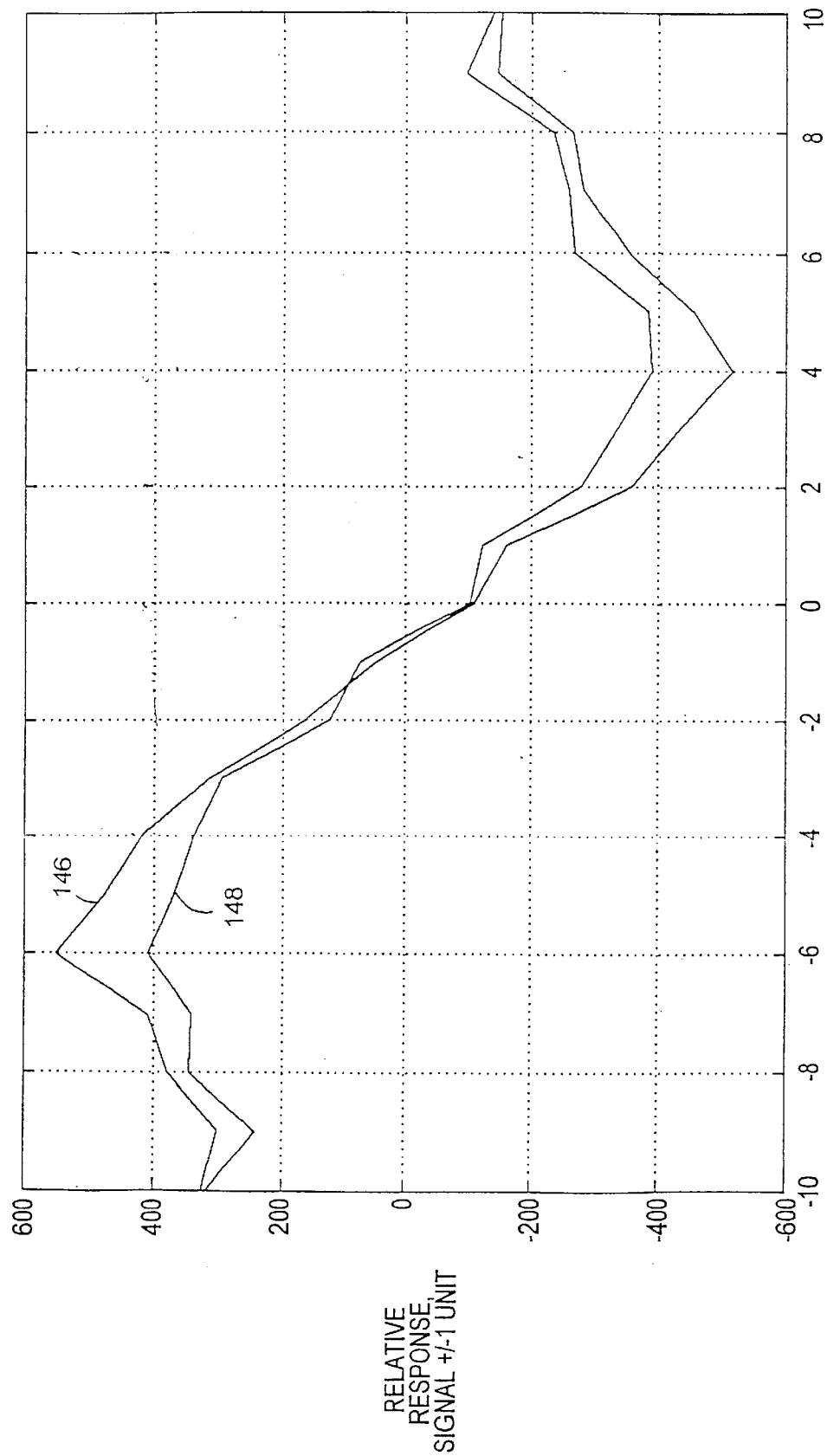
Figure 26:
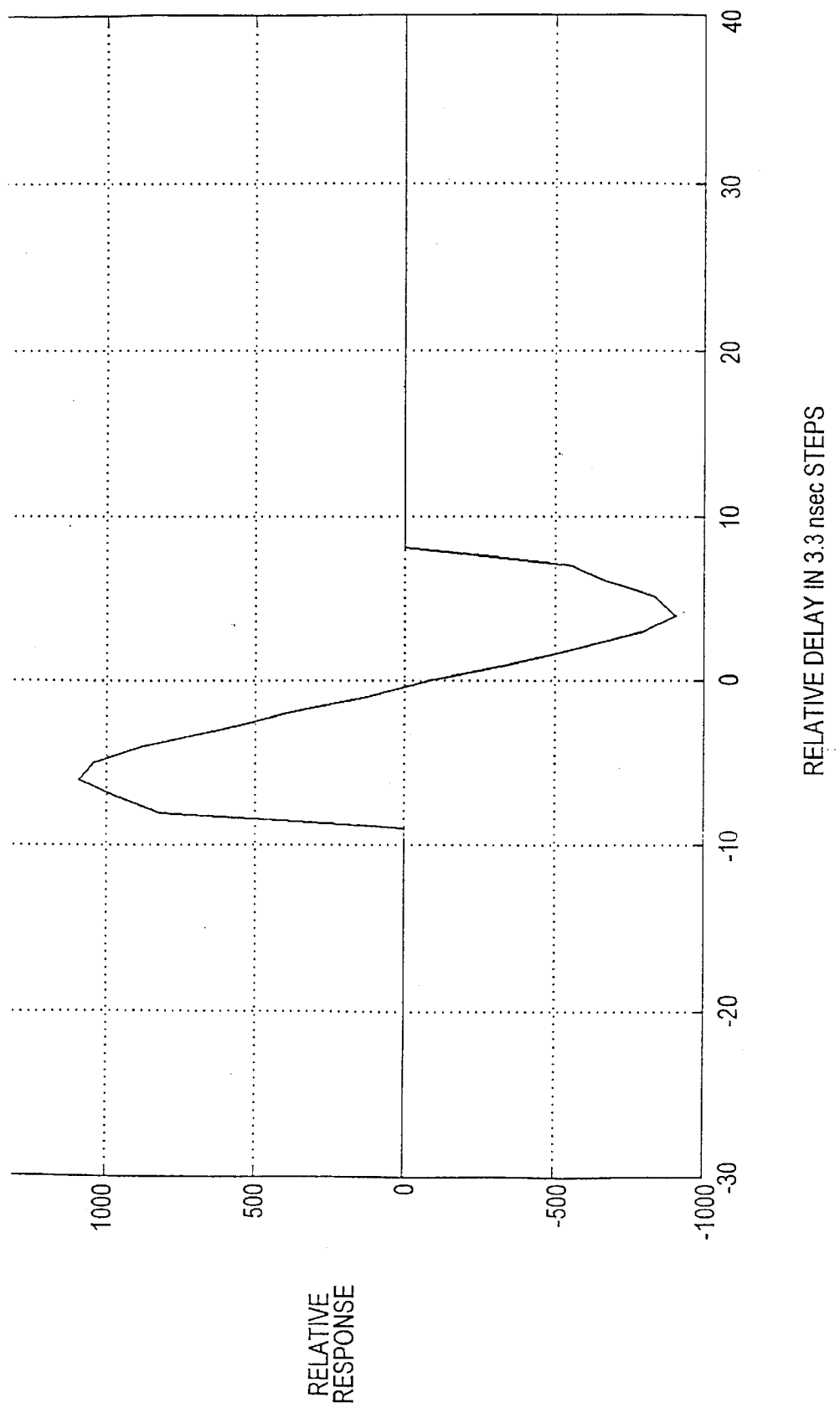

FIG. 22 shows a superimposed result of the autocorrelation sequences in FIG. 19 with and without a 1 code bit delay. The simulation was made using Barker sequences with filtering and without noise injection. This code exhibited a higher degree of sidelobe distortion near the central peak than in the ideal case. FIG. 23 shows the sum and difference of autocorrelation functions of FIG. 22. FIG. 24 shows an autocorrelation channel difference signal over a range of delay values sufficient to observe the central discriminator function. The correlation sequence consisted of the double concatenated eleventh order Barker sequence. The received signal carrier-to-noise ration is 0.1:1, with the plot superimposing ten data set results. The relative response zero crossing has an envelope representing the peak-to-peak ranging uncertainty. The mean crossing point of the function is slightly delayed from the actual zero delay value due to model calibration errors. The signal is not masked by the output of the sum signal negative signal detection threshold. FIG. 25 compares the difference signal transfer function using summed zero crossing thresholds with digital value signal integration at a low carrier-to-noise ratio of 0.1:1. The result of an analog integration is shown as function 126. The result of a digital integration is shown as function 128. The transfer function of the zero-crossing processing is very close to the performance of the ideal signal integration. The expected signal processing degradation due to digital zero-crossing processing is only 1–2 dB. FIG. 26 shows the effect on the difference signal transfer function of signal crosstalk at zero range delay. In this case the crosstalk is five times the received signal. The masking of the sum signal channel causes the edge of the central transfer function to collapse toward zero delay as interference increase.

Figure 27:
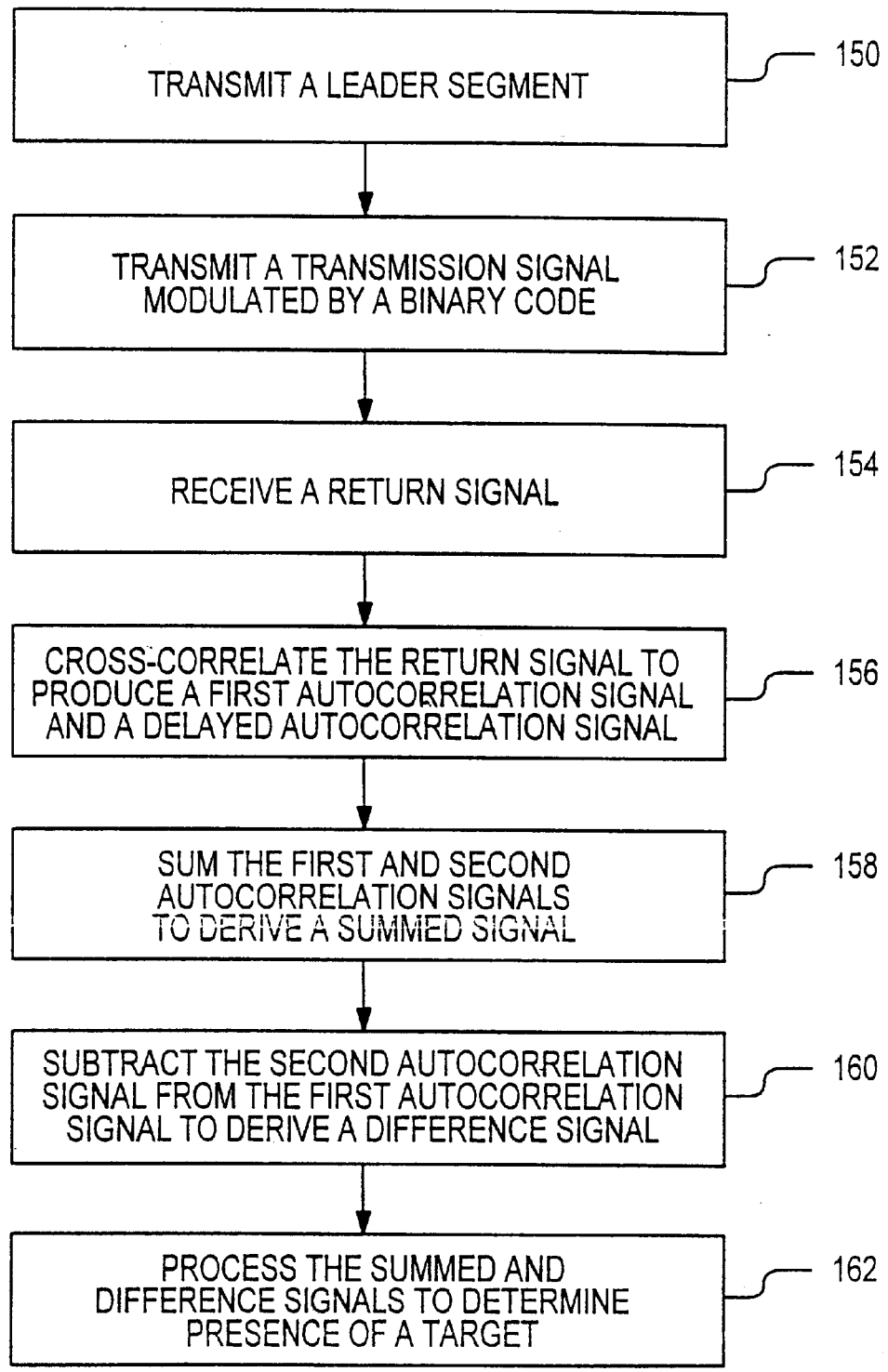
FIG. 27 is a flow diagram of a method of detecting and ranging objects in accordance with the present invention.

A method of detecting and ranging objects from the proximity detector in accordance with the invention will be described with reference to FIG. 27. At step 150, a leader segment is transmitted by a transmitter of the proximity detector. The leader segment is an optical signal that is utilized by the proximity detector to establish an amplitude reference, when the leader segment is reflected from a target and received by the proximity detector. The leader segment may be a constant half-powered optical signal. Alternatively, the leader segment may be a series of full-powered pulses separated by enough space to yield an average power equal to half power. Next, at step 152, an optical transmission signal that has been modulated in accordance with the preferred code, i.e., the double concatenated eleventh order Barker-based code, is transmitted by the transmitter.

Subsequent to step 152, a return signal is received by a receiver of the proximity detector at step 154. The return signal may include a portion of the leader segment and transmission signal that have been reflected from a target at a particular distance from the proximity detector. In order to determine if the return signal is a reflected transmission signal, the proximity detector cross-correlates the return signal with two delayed versions of the preferred code at step 156. The first delayed code is time-delayed to correspond to the particular distance from the proximity detector. The second delayed code is further time-delayed by a one-bit period with respect to the first delayed code. Using the delayed codes, first and second autocorrelation signals are produced. The first autocorrelation signal is produced by correlating the return signal with the first delayed signal, while the second autocorrelation signals are produced by correlating the return signal with the second delayed signal. At step 158, the first and second autocorrelation signals are summed by the proximity detector to derive a summed signal. At step 160, the second autocorrelation signal is subtracted from the first autocorrelation signal to derive a difference signal. Preferably, steps 158 and 160 are performed in a parallel manner. At step 162, the summed and difference signals are processed by a microcontroller of the proximity detector to determine whether a target is present at the particular distance from the proximity detector.

Although the invention has been described as a proximity detector that is used to detect and/or track an object located in a blind spot of an automobile, other applications of the proximity detector have been contemplated. The proximity detector may be included in a safety system for other pre-collision detections, such as pre-collision detection during a back-up of an automobile. Alternatively, the proximity detector may be installed in a security system on a premises to detect unauthorized intrusion within a set perimeter around the premises. In addition, the proximity detector may be utilized for robotic vision. The proximity detector can be implemented in any number of systems in which detection and/or tracking of objects are/is desired.

What is claimed is:

1. A system for detecting and ranging objects comprising:
   sequence generating means for providing a binary code having an autocorrelation function with negative sidelobes;
   transmitting means electrically coupled to said sequence generating means for emitting a transmission signal that is representative of said binary code;
   reception means operatively associated with said transmitting means for receiving a return signal;
   first correlating means connected to said reception means and said sequence generating means for comparing said return signal with a first correlation signal to produce a first autocorrelation signal, said first correlation signal being said binary code with a selected time delay;
   second correlating means connected to said reception means and said sequence generating means for comparing said return signal with a second correlation signal to produce a second autocorrelation signal, said second correlation signal being said first correlation signal with a preselected delay period;
   calculating means electrically coupled to said first and second correlating means for generating a sum signal and a difference signal, said sum signal being at least partially based on combining said first and second autocorrelation signals, said difference signal being at least partially based on a difference between said first and second autocorrelation signals; and
   processing means for analyzing said sum and difference signals to determine whether said return signal is an echo of said transmission signal from a target.

2. The system of claim 1 wherein said binary code provided by said sequence generating means is based on an eleventh order Barker-based code, said preselected delay period being a one-bit delay.

3. The system of claim 2 wherein said binary code is a double concatenated eleventh order Barker-based code.

4. The system of claim 1 wherein said transmitting means includes an optical pulse emitter and wherein said transmission signal is composed of light energy.

5. The system of claim 4 wherein said optical pulse emitter is a semiconductor device.

6. The system of claim 4 wherein said reception means includes a photodiode to detect said return signal, said photodiode being configured to generate current in response to said return signal.

7. The system of claim 4 further comprising a state controller that is connected to said sequence generating means to invert said binary code for input to said transmitting means and said first and second correlating means, said inversion being selectively invoked by said state controller.

8. The system of claim 7 wherein said state controller is configured to direct said transmitting means to modulate said optical pulse emitter to emit a leader segment prior to transmitting said transmission signal, said leader segment having an average amplitude equal to a selected portion of the maximum amplitude of said transmission signal to establish a reference amplitude when an echo of said transmission signal is received by said reception means.

9. The system of claim 1 wherein said sequence generating means is operationally responsive to said processing means to adjust said selected time delay for said first correlation signal, said adjustment being made in response to movement of said target for tracking said target.

10. A method of detecting and ranging objects from a source location comprising steps of:
    transmitting a transmission signal from a ranging detector at said source location, including modulating said transmission signal in accordance to a binary code having an autocorrelation function with negative sidelobes;
    subsequent to said step of transmitting said transmission signal, receiving a return signal by said ranging detector at said source location;
    cross-correlating said return signal with a first correlation signal and a second correlation signal to produce a first autocorrelation signal and a second autocorrelation signal, said first and second correlation signals being time-delayed versions of said binary code, said second correlation signal being further time-delayed than said first correlation signal by a preselected bit period;
    combining said first and second autocorrelation signals in a manner at least partially based on a signal summing to derive a summed signal;
    combining said first and second autocorrelation signals in a manner at least partially based on a signal differencing to derive a difference signal; and
    processing said summed and difference signals by a processor of said ranging detector to determine presence of a target, said presence being defined by relative amplitudes of said summed and difference signals.

11. The method of claim 10 wherein said step of modulating said transmission signal is a step of modulating said transmission signal in accordance to a double concatenated eleventh order Barker-based code.

12. The method of claim 10 further comprising a step of transmitting a leader segment, prior to said step of transmitting said transmission signal, to establish an amplitude reference when said leader segment and said transmission signal are received by said ranging detector.

13. The method of claim 10 further comprising steps of:
    repeating said steps of transmitting, receiving, cross-correlating, summing and differencing to derive next-summed and difference signals; and
    comparing said next-summed and difference signals with said summed and difference signals to determine a relative direction of movement of said target with respect to said ranging detector.

14. The method of claim 13 further comprising a step of adjusting time delays of said first and second autocorrelation signals to track said target in response to said determination of said relative direction of movement of said target.

15. The method of claim 10 further comprising a step of transmitting a second transmission signal from said ranging detector, wherein said second transmission signal has been modulated in accordance with a second binary code, said second binary code being an inverted version of said binary code.

16. The method of claim 10 wherein said step of transmitting said transmission signal is a step of transmitting an optical transmission signal, and wherein said step of receiving said return signal is a step of receiving an optical return signal.

17. A system for detecting presence of objects at a vicinity from a source location comprising:

a code sequence generator configured to generate a binary code having an autocorrelation function with negative sidelobes;

a transmitter electrically coupled to said code sequence generator to emit an electromagnetic signal that is representative of said binary code;

a receiver operatively associated with said transmitter to receive a return electromagnetic signal;

a first correlator connected to said receiver and said code sequence generator designed to compare said return signals with a first correlation code to produce a first autocorrelation signal, said first correlation code being said binary code with a selected time delay, said selected time delay defining a predetermined proximity from said source location being monitored;

a second correlator connected to said receiver and said code sequence generator designed to compare said return signal with a second correlation code to produce a second autocorrelation signal, said second correlation code being said first correlation code with a one-bit period delay;

calculating means electrically coupled to said first and second correlators for summing and subtracting said first and second autocorrelation signals in order to output a sum signal and a difference signal; and a processor connected to said calculating means to analyze said sum and difference signals, said processor configured to determine whether said return signal is an echo of said emitted electromagnetic signal from a target at said predetermined proximity by the analysis of said sum and difference signals.

18. The system of claim 17 wherein said transmitter is configured to emit said electromagnetic signal in an optical form, and wherein said receiver is configured to receive optical signals.

19. The system of claim 17 wherein said processor is connected to said fist and second correlators to adjust said selected time delay to modify said first and second correlation signals in order to track said target by varying said predetermined proximity being monitored.

20. The system of claim 17 wherein said binary code is a double concatenated eleventh order Barker-based code.

\* \* \* \* \*